(12) United States Patent
Wang et al.

(10) Patent No.: US 10,655,048 B1
(45) Date of Patent: May 19, 2020

(54) OIL WELL CEMENT SETTLEMENT STABILIZER FOR HIGH-TEMPERATURE CEMENTING OF OIL AND GAS WELLS AND PREPARATION METHOD THEREOF, AND CEMENT SLURRY

(71) Applicant: China University of Petroleum (East China), Shandong (CN)

(72) Inventors: Chengwen Wang, Shandong (CN); Huan Wang, Shandong (CN); Zizhen Wang, Shandong (CN); Yucheng Xue, Shandong (CN); Ruihe Wang, Shandong (CN); Xin Chen, Shandong (CN); Wenfei Li, Shandong (CN)

(73) Assignee: China University of Petroleum (East China), Shandong (CN)

( * ) Notice: Subject to any disclaimer, the term of this patent is extended or adjusted under 35 U.S.C. 154(b) by 0 days.

(21) Appl. No.: 16/275,997

(22) Filed: Feb. 14, 2019

(30) Foreign Application Priority Data

Nov. 21, 2018 (CN) .......................... 2018 1 1392123

(51) Int. Cl.
*C09K 8/467* (2006.01)
*C08F 220/56* (2006.01)
(Continued)

(52) U.S. Cl.
CPC ............ *C09K 8/467* (2013.01); *C04B 24/163* (2013.01); *C08F 26/02* (2013.01); *C08F 28/02* (2013.01);
(Continued)

(58) Field of Classification Search
CPC ........ C09K 8/467; C09K 8/42; C04B 24/163; C08F 220/56; C08F 26/02; C08F 28/02; C08F 226/02
See application file for complete search history.

(56) References Cited

U.S. PATENT DOCUMENTS 4,015,991 A * 4/1977 Persinski .............. C04B 24/163
524/5
4,702,319 A * 10/1987 Bock ...................... C09K 8/588
166/275

FOREIGN PATENT DOCUMENTS

CN          10176505 A      12/2015
CN         106279523 A  *   1/2017
(Continued)

*Primary Examiner* — Ling Siu Choi
*Assistant Examiner* — David L Miller
(74) *Attorney, Agent, or Firm* — Duane Morris LLP

(57) ABSTRACT

An oil well cement settlement stabilizer is ternary cement settlement stabilizer or quaternary cement settlement stabilizer; wherein the quaternary cement settlement stabilizer containing structural units A represented by formula (I), structural units B represented by formula (II), structural units C represented by formula (III), and structural units D represented by formula (IV); Wherein the ternary cement settlement stabilizer containing structural units A represented by formula (I), structural units B represented by formula (II), and structural units D represented by formula (IV);

(Continued)

ACCOMPANYING DRAWING

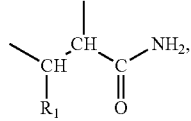

formula (I)

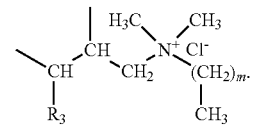

-continued formula (IV)

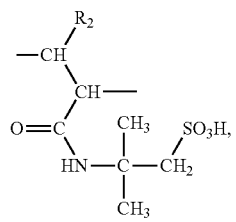

formula (II)

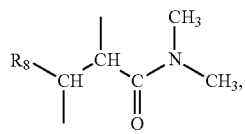

formula (III)

16 Claims, 5 Drawing Sheets

(51) Int. Cl.
  *C04B 24/16* (2006.01)
  *C08F 220/58* (2006.01)
  *C08F 28/02* (2006.01)
  *C09K 8/42* (2006.01)
  *C08F 26/02* (2006.01)
  *C08F 226/02* (2006.01)

(52) U.S. Cl.
  CPC .......... *C08F 220/56* (2013.01); *C08F 220/58* (2013.01); *C08F 226/02* (2013.01); *C09K 8/42* (2013.01); *C08F 2220/585* (2013.01); *C08F 2800/20* (2013.01)

(56) References Cited

FOREIGN PATENT DOCUMENTS

CN  107162512 A  9/2017
CN  107892514 A  4/2018

* cited by examiner

ACCOMPANYING DRAWING

OIL WELL CEMENT SETTLEMENT STABILIZER FOR HIGH-TEMPERATURE CEMENTING OF OIL AND GAS WELLS AND PREPARATION METHOD THEREOF, AND CEMENT SLURRY

PRIORITY CLAIM AND CROSS REFERENCE

The application claims priority to Chinese Application No. 201811392123.9, filed on Nov. 21, 2018, entitled "Oil well cement settlement stabilizer for high-temperature cementing of oil and gas wells and preparation method thereof, and cement slurry", and Chinese Application No. 201811393318.5, field on Nov. 21, 2018, entitled "Oil well cement settlement stabilizer for cementing of oil and gas wells and preparation method thereof, and cement slurry", which are specifically and entirely incorporated herein by reference.

FIELD OF THE INVENTION

The present invention belongs to the field of oil and natural gas cementing engineering, particularly to an oil well cement settlement stabilizer for high-temperature cementing of oil and gas wells, a method for preparing the oil well cement settlement stabilizer for high-temperature cementing of oil and gas wells, and cement slurry containing the oil well cement settlement stabilizer.

BACKGROUND

The exploration and development of oil and gas resources in China has been oriented to oil and gas resources in oceans and deep strata and unconventional oil and gas resources. Complex oil and gas wells that have special structures, such as deep wells and extra-deep wells, etc., have been widely applied, which has raised higher requirements for oil and gas well cementing techniques. In high-temperature environments, the settlement instability problem of cement slurry becomes more prominent, has strong impacts on the quality of cementing work and threatens the safety of the work.

The settlement stability of cement is one of important indexes for evaluating the performance of the cement as well as one of important factors that have influence on the quality of cementing work. The poor settlement stability of cement slurry is mainly resulted from two causes: one cause is the high-temperature thinning and dispersion effects of the additives and admixtures of the cement; the other cause is the intensified Brownian movement of the molecules in the particles of the cement slurry at high temperature, which destroys the viscous force in the slurry and thins the slurry. Wherein, slurry thinning resulted from high-temperature sensitivity of cement slurry is the principal cause for the poor settlement stability of cement slurry. Once the cement slurry becomes instable during settlement, the solid particles may settle and free water may precipitate, causing bridge plugging or forming oil, gas, and water channeling paths; thus, the non-uniformity of the hardened cement formed in that process will be more prominent and eventually result in degraded quality of failure of cementing.

To alleviate the problem of settlement instability of high-temperature cementing cement slurry, measures such as decreasing the water-cement ratio of the oil well cement slurry appropriately, performing deep-processing of the particles of admixtures, and optimizing the grading of the cement particles, etc., may be taken. Though those measures can solve the problem of settlement instability of cement slurry to some extent, they still have the following drawbacks: (1) the initial consistency of the slurry may be excessively high, resulting in increased difficulties in slurry pumping; (2) the processing cost is high, and the process is complex; (3) the stability of the cement slurry may be improved in low temperature cementing environments, but the effect is not ideal in high-temperature environments, such as deep wells and extra-deep wells, etc. Therefore, presently, settlement stabilizers are widely used to alleviate the problem of settlement instability. The settlement stabilizers include inorganic materials and high molecular polymers, and have advantages including low cost, simple process, and excellent thickening effect, etc. Wherein, settlement stabilizers made of inorganic materials are less susceptible to temperature and have an advantage that they are not degraded or diluted at high temperature; however, the side effects incurred by the thickening effect are obvious, and the initial consistency of the slurry is high, resulting in difficulties in cement injection and pumping and increased difficulties in cementing operations; though settlement stabilizers made of natural high molecular polymers have advantages including high viscosity, wide sources, and low cost, they will be degraded severely as the temperature is increased; consequently, the viscosity is decreased obviously, and the settlement inhibition ability of the system is severely decreased; though settlement stabilizers made of synthetic high molecular polymers have stable performance, are easy to regulate and control, and can effectively improve the viscosity of the slurry and remarkably improve the settlement stability of the cement slurry, they depend on the temperature closely, and may be hydrolyzed and thinned during shearing at high temperature; consequently, the consistency of the slurry is obviously decreased, and the settlement inhibition capability is severely degraded.

Zhang Hao, Li Houming (Zhang Hao, Cementing with stable suspending agent SS-10L study application [J]. Science technology and engineering, 2014), developed an oil well cementing using suspension stabilizer, by Welan gum as an organic suspension components, mineral B as inorganic suspended components and the composition of surfactant C, the experimental results and the field application shows that the added amount of suspension stabilizer is extremely low, good compatibility with admixture, cost-effective, but poor heat resistance ability, makes the slurry thickening in low temperature and high temperature is thinning. Xia Chun (Xia Chun, the mechanism research of ACS New grouting stabilizer [J]. Journal of civil engineering, 2005, 38 (6): 89-91.), developed ACS slurry stabilizer by polyacrylamide is with acrylic acid graft copolymer and compounded inorganic chemical materials, and other components of the, belongs to the polymer surface active agent, the results show that the ACS slurry stabilizer can obviously improve the cement strength, low water cement ratio, the enhancement effect is significant, but the effect is not obvious when high water cement ratio.

The patent document CN105176505A has disclosed a cement slurry stabilizer for cementing, which comprises 54-89pbw quartz sand, 2-20pbw Welan gum, 1-8pbw xanthan gum, 3-10pbw polyvinyl alcohol, and 3-8pbw grafted high molecular polymer. The stabilizer not only can improve the stability of cement slurry, but also have no adverse effect to other properties of the cement slurry in the application process. In addition, the stabilizer is beneficial for the compression strength of the set cement. However, the cement stabilizer can't be applied well to high-temperature cementing, because it doesn't have a thermoviscosifying effect and may be diluted at high temperature.

The patent document CN107162512A has disclosed a temperature-resistant cement slurry system for extra-deep wells, which comprises cement, high-temperature filtrate reducer, silica sand, high-temperature setting retarder, high-temperature stabilizer and disperser. By adding temperature-resistant admixtures, the cement slurry system solves the problem of unstable performance of the cement slurry at high temperature; however, pumping of the slurry is more difficult because the initial consistency of the slurry is excessively high.

The patent document CN107892514A has disclosed settlement-inhibiting cement slurry that is stable at high temperature, wherein, gaseous silicon dioxide and photo-voltaic silicon are added into the cement slurry after a series of high-temperature admixtures are added. Therefore, the cement slurry has advantages including adjustable thickening time and better inhibition ability against degradation at high temperature; however, the compression strength of the hardened cement is affected to some degree, and the quality of cementing work is affected adversely.

In view of the drawbacks of existing thickeners and stabilizers, such as increased difficulties in slurry pumping incurred by excessively high initial consistency of slurry in low temperature environments, and degraded quality of cementing work incurred by thinning of the cement slurry at high temperature, etc., there is an urgent need for a novel synthetic polymer to attain the objective of settlement control of high-temperature cement slurry. The novel polymer shall have a characteristic that it doesn't thicken at low temperature and thickens as the downhole temperature is increased. At present, N-alkylated acrylamide polymers, which are conventional temperature-sensitive polymers discovered at the earliest, are applied widely. The conventional temperature-sensitive polymer N-alkylated acrylamide polymers realize temperature-sensitive thickening by introducing an amphiphilic temperature-sensitive monomer. When the temperature is lower than the lower critical solution temperature (LCST) (i.e., the turbidity point), N-alkylated acrylamide polymers mainly exhibit hydrophilicity and can be dissolved uniformly in water; in that state, the apparent viscosity of the water solution is low; when the temperature exceeds the lower critical solution temperature (LSCT), the hydrophobicity of N-alkylated acrylamide polymers is enhanced, the hydrogen bonds between amido groups in the molecular chains and water molecules are broken, and the hydrophobic groups on the molecular chains start to contract and accumulate as the temperature is increased; thus, the polymer molecules start to accumulate and precipitate from the liquid phase, and thereby the viscosity of the solution is increased significantly. However, since the hydrophobicity of N-alkylated acrylamide temperature-sensitive polymers is weak, and the thickening temperature range is 20-50° C., N-alkylated acrylamide polymers can't meet the requirements of high-temperature cementing, and are unsuitable for use as settlement stabilizers for high-temperature cement slurry.

Up to now, there is no satisfactory solution to the problem of settlement instability of high-temperature cement slurry yet. Especially, as the temperature of the strata is increased, the settlement instability of the oil well cement slurry becomes more prominent. Therefore, further invention and development are required to synthesize a novel oil well cement settlement stabilizer.

SUMMARY OF THE INVENTION

To solve the problem of settlement instability of high-temperature cement slurry for oil and gas wells in the prior art, the present invention provides an oil well cement settlement stabilizer for high-temperature cementing, a preparation method of the oil well cement settlement stabilizer, and cement slurry. The oil well cement settlement stabilizer provided in the present invention can attain a goal of "non-thickening at low temperature but thickening at high temperature", and thereby can effectively solve the problem of settlement instability of cement slurry, ensure safety in oil and gas resource exploitation, and improve overall quality of cementing work.

To attain the objects described above, in a first aspect, the present invention provides an oil well cement settlement stabilizer for high-temperature cementing of oil and gas wells, the oil well cement settlement stabilizer containing ternary cement settlement stabilizer or quaternary cement settlement stabilizer.

The quaternary cement settlement stabilizer contains structural units A represented by formula (I), structural units B represented by formula (II), structural units C represented by formula (III), and structural units D represented by formula (IV); wherein the molar ratio of the structural units A to the structural units B to the structural units C to the structural units D is x:y:z:q=1:(0.09-0.34):(0.28-0.36):(0.03-0.05).

The ternary cement settlement stabilizer containing structural units A represented by formula (I), structural units B represented by formula (II), and structural units D represented by formula (IV); wherein the molar ratio of the structural units A to the structural units B to the structural units D is p:n:t=1:(0.07-0.22):(0.03-0.11);

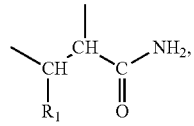

formula (I)

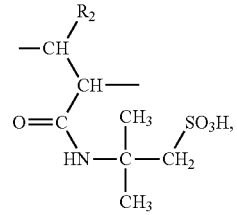

formula (II)

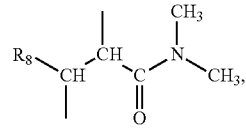

formula (III)

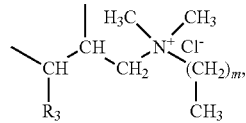

formula (IV)

wherein $R_1$, $R_2$, $R_3$ and $R_8$ are the same as or different from each other, and are H or $C_1$-$C_4$ substituted or unsubstituted alkyl respectively and independently;

wherein m is 15, 17, 19 or 21.

In a second aspect, the present invention provides a method for preparing the oil well cement settlement stabilizer describe above comprising:

mixing a monomer A, a monomer B, a monomer C, a monomer D, and deionized water and then controlling them to have a copolymerization reaction in the presence of an initiator; wherein the monomer A, the monomer B, the monomer C, and the monomer D are dosed so that the molar ratio of the structural units A to the structural units B to the structural units C to the structural units D in the oil well cement settlement stabilizer is x:y:z:q=1:(0.09-0.34):(0.28-0.36):(0.03-0.05);

or mixing a monomer A, a monomer B, a monomer D, and deionized water and then controlling them to have a copolymerization reaction in the presence of an initiator; Wherein the molar ratio of the structural units A to the structural units B to the structural units D in the oil well cement settlement stabilizer is p:n:t=1:(0.07-0.22):(0.03-0.11);

wherein the monomer A has a structure represented by formula (V), the monomer B has a structure represented by formula (VI), the monomer C has a structure represented by formula (VII), and the monomer D has a structure represented by formula (VIII);

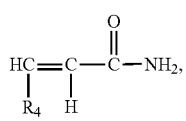

formula (V)

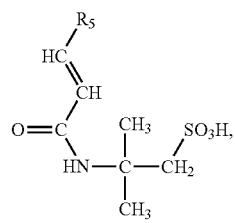

formula (VI)

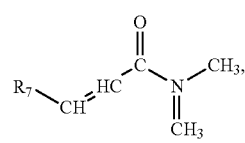

formula (VII)

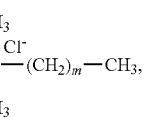

formula (VIII)

wherein $R_4$, $R_5$, $R_6$ and $R_7$ are the same as or different from each other, and are H or $C_1$-$C_4$ substituted or unsubstituted alkyl respectively and independently;
wherein m is 15, 17, 19 or 21.

In a third aspect, the present invention provides a cement slurry containing the quaternary cement settlement stabilizer of the oil well described above or the quaternary cement settlement stabilizer of the oil well prepared with the method described above; preferably, based on the total weight of the cement slurry, the dose of the quaternary cement settlement stabilizer of the oil well may be 0.4-0.8 wt %.

In a fourth aspect, the present invention provides a cement slurry containing the ternary cement settlement stabilizer of the oil well described above or the ternary cement settlement stabilizer of the oil well prepared with the method described above; preferably, based on the total weight of the cement slurry, the dose of the ternary cement settlement stabilizer of the oil well may be 0.5-1.0 wt %.

In a fifth aspect, the present invention provides a use of the quaternary cement settlement stabilizer of the oil well described above, or the quaternary cement settlement stabilizer of the oil well prepared with the method described above, or the cement slurry described above in the field of oil and natural gas cementing engineering.

In a sixth aspect, the present invention provides a use of the ternary cement settlement stabilizer of the oil well described above, or the ternary cement settlement stabilizer of the oil well prepared with the method described above, or the cement slurry described above in the field of oil and natural gas cementing engineering.

With the technical scheme described above, by introducing rigid hydrophobic monomers into copolymers in the present invention, the copolymers can actively adapt to downhole temperature variations and the application environment of cement slurry, and attain a goal of "non-thickening at low temperature but thickening at high temperature". Thus, generation of solid-phase substances and free liquid from the cement slurry under a diluting effect at high temperatures can be prevented effectively, and thereby the settlement stability of the cement slurry can be improved effectively.

BRIEF DESCRIPTION OF DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. In the figures.

Figure 1:
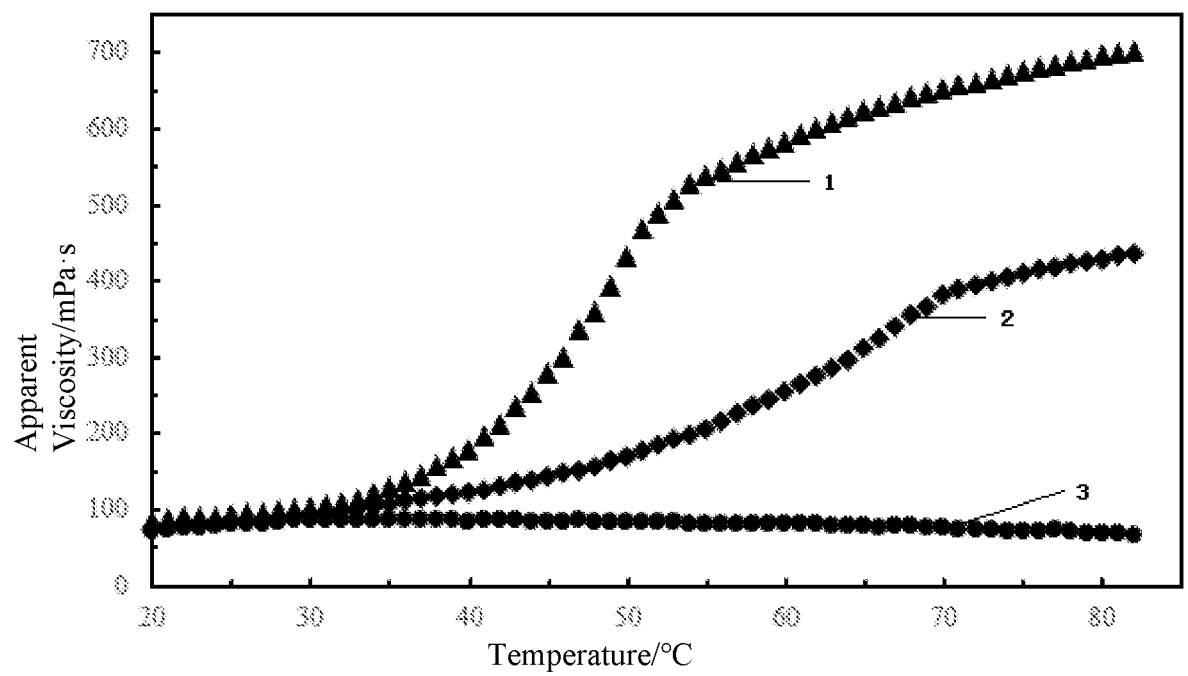
FIG. 1 shows rheological curves of the quaternary cement settlement stabilizer of the oil well at different concentration values in example 1 of the present invention.

DESCRIPTION OF REFERENCE NUMBERS 1. 0.6 wt % quaternary oil well cement settlement stabilizer
2. 0.4 wt % quaternary oil well cement settlement stabilizer
3. 0.2 wt % quaternary oil well cement settlement stabilizer
4. 0.6 wt % quaternary oil well cement settlement stabilizer
5. 0.6 wt % hydroxyethyl cellulose
6. 0.6 wt % xanthan gum
7. 0.6 wt % hydroxypropylguar gum
8. Thermogravimetric curve
9. Differential thermal curve
10. 0.4 wt % ternary oil well cement settlement stabilizer
11. 0.2 wt % ternary oil well cement settlement stabilizer
12. 0 wt % NaOH
13. 0.01 wt % NaOH
14. 0.1 wt % NaOH
15. 1 wt % NaOH
16. 4 wt % NaOH
17. 0 wt % NaCl
18. 0.05 wt % NaCl
19. 0.2 wt % NaCl
20. 0.65 wt % NaCl
21. 3 wt % NaCl
22. cement slurry
23. added 0.025 wt % ternary oil well cement settlement stabilizer
24. added 0.05 wt % ternary oil well cement settlement stabilizer
25. added 0.10 wt % ternary oil well cement settlement stabilizer
26. 0.6 wt % ternary oil well cement settlement stabilizer
27. 0.6 wt % hydroxyethyl cellulose
28. 0.6 wt % xanthan gum
29. 0.6 wt % AM/AMPS copolymer

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides an oil well cement settlement stabilizer for high-temperature cementing of oil and gas wells, the oil well cement settlement stabilizer is ternary cement settlement stabilizer or quaternary cement settlement stabilizer;

wherein the quaternary cement settlement stabilizer containing structural units A represented by formula (I), structural units B represented by formula (II), structural units C represented by formula (III), and structural units D represented by formula (IV); wherein the molar ratio of the structural units A to the structural units B to the structural units C to the structural units D is x:y:z:q=1:(0.09-0.34):(0.28-0.36):(0.03-0.05);

wherein the ternary cement settlement stabilizer containing structural units A represented by formula (I), structural units B represented by formula (II), and structural units D represented by formula (IV); wherein the molar ratio of the structural units A to the structural units B to the structural units D is p:n:t=1:(0.07-0.22):(0.03-0.11);

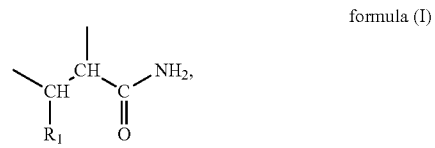

formula (I)

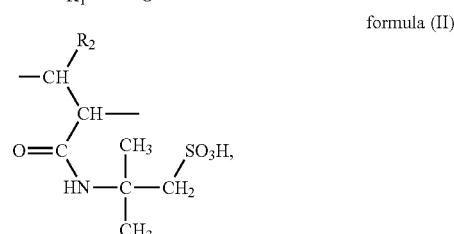

formula (II)

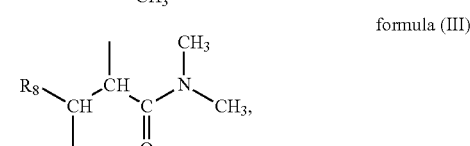

formula (III)

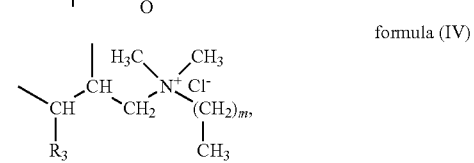

formula (IV)

wherein $R_1$, $R_2$, $R_3$ and $R_8$ are the same as or different from each other, and are H or $C_1$-$C_4$ substituted or unsubstituted alkyl respectively and independently;

wherein m is 15, 17, 19 or 21.

Wherein in the present invention, it should be noted: the molar ratio of the structural units A to the structural units B to the structural units C to the structural units D is x:y:z:q=1:(0.09-0.34):(0.28-0.36):(0.03-0.05), wherein x is the mole number of the structural units A of the quaternary cement settlement stabilizer, y is the mole number of the structural units B of the quaternary cement settlement stabilizer, z is the mole number of the structural units C of the quaternary cement settlement stabilizer, and q is the mole number of the structural units D of the quaternary cement settlement stabilizer.

Wherein in the present invention, it should be noted: the molar ratio of the structural units A to the structural units B to the structural units D is p:n:t=1:(0.07-0.22):(0.03-0.11), wherein p is the mole number of the structural units A of the ternary cement settlement stabilizer, n is the mole number of the structural units B of the ternary cement settlement stabilizer, and t is the mole number of the structural units D of the ternary cement settlement stabilizer.

According to the present invention, preferably, $R_1$, $R_2$, $R_3$ and $R_8$ are the same as or different from each other, and are H, methyl, ethyl, n-propyl, isopropyl, or butyl respectively and independently, more preferably are H; preferably, m is 17, 19 or 21. In addition, in the present invention, in the case that the $R_1$, $R_2$, $R_3$, and $R_8$ are H respectively and independently, the structural units A are acrylamide groups, the structural units B are 2-acrylamido-2-methyl propanesulfonic acid groups, the structural units C are N,N-dimethylacrylamide groups, and the structural units D are rigid hydrophobic monomer groups.

According to the present invention, the weight-average molecular weight of the quaternary oil well cement settlement stabilizer is 4,200,000-5,500,000, preferably is 4,500,000-5,300,000. In the present invention, the quaternary oil well cement settlement stabilizer is confined to have the above-mentioned components and the above-mentioned weight-average molecular weight to effectively prevent generation of solid-phase substances and free liquid from the cement slurry incurred by a diluting effect under a high-temperature condition, and thereby effectively improve the settlement stability of cement slurry.

According to the present invention, the weight-average molecular weight of the ternary oil well cement settlement stabilizer is 3,000,000-5,000,000, preferably is 3,500,000-5,000,000. In the present invention, the ternary oil well cement settlement stabilizer is confined to have the above-mentioned components and the above-mentioned weight-average molecular weight, it can improve the subsidence stability of cement slurry, effectively solve the problem of unstable subsidence of cement slurry, guarantee the safe development of oil and gas and improve the cementing quality.

In a second aspect, the present invention provides a method for preparing the oil well cement settlement stabilizer describe above comprising:

mixing a monomer A, a monomer B, a monomer C, a monomer D, and deionized water and then controlling them to have a copolymerization reaction in the presence of an initiator; wherein the monomer A, the monomer B, the monomer C, and the monomer D are dosed so that the molar ratio of the structural units A to the structural units B to the structural units C to the structural units D in the oil well cement settlement stabilizer is x:y:z:q=1:(0.09-0.34):(0.28-0.36):(0.03-0.05);

or mixing a monomer A, a monomer B, a monomer D, and deionized water and then controlling them to have a copolymerization reaction in the presence of an initiator; Wherein the molar ratio of the structural units A to the structural units B to the structural units D in the oil well cement settlement stabilizer is p:n:t=1:(0.07-0.22):(0.03-0.11);

The monomer A has a structure represented by formula (V), the monomer B has a structure represented by formula (VI), the monomer C has a structure represented by formula (VII), and the monomer D has a structure represented by formula (VIII);

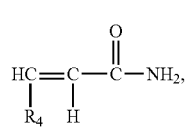

formula (V)

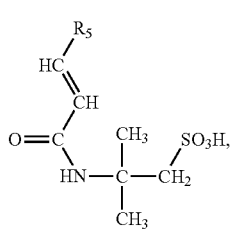

formula (VI)

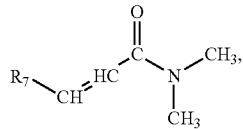

formula (VII)

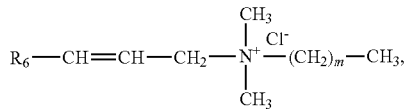

formula (VIII)

wherein $R_4$, $R_5$, $R_6$ and $R_7$ are the same as or different from each other, and are H or $C_1$-$C_4$ substituted or unsubstituted alkyl respectively and independently;

wherein m is 15, 17, 19 or 21.

The weight ratio of the monomer A to the monomer B to the monomer C to the monomer D is (1-30):(1-10):(1-10):1, preferably is (4-20):(1-6):(2-10):1.

The weight ratio of the monomer A to the monomer B to the monomer D is (1-10):(0.5-5):1, preferably is (1-5):(0.5-3):1.

Preferably, the total dose of the monomer A, the monomer B, the monomer D, and optionally the monomer C is 30-40 wt % of the dose of the deionized water;

Preferably, in the preparation of the quaternary cement settlement stabilizer, the pH of the mixed solution obtained after the monomer A, the monomer B, the monomer C, and the monomer D are mixed is 6-8.

Preferably, in the preparation of the ternary cement settlement stabilizer, the pH of the mixed solution obtained after the monomer A, the monomer B, and the monomer D are mixed is 8-9.

According to the present invention, preferably, $R_4$, $R_5$, $R_6$ and $R_7$ are the same as or different from each other, and are H, methyl, ethyl, n-propyl, isopropyl, or butyl respectively and independently, more preferably are H; preferably, m is 17, 19 or 21. In addition, in the present invention, in the case that the $R_4$, $R_5$, $R_6$, and $R_7$ are H respectively and independently, the monomer A is acrylamide, the monomer B is 2-acrylamido-2-methyl propanesulfonic acid, the monomer C is N,N-dimethylacrylamide, and the monomer D is a rigid hydrophobic monomer.

According to the present invention, as one of the reacting monomers, the acrylamide has advantages in that the acrylamide has excellent water dissolubility and is low in price, the main chain of the polymer synthesized from acrylamide that serves as the principal monomer is of a C—C structure, which has excellent chemical stability, so that the polymer has certain temperature-resistance and salinity tolerance properties; in addition, the amido group in acrylamide has excellent water dissolubility, and has no detrimental effect to the cement slurry, such as slow setting or flash setting, etc. In the present invention, the acrylamide (AM) is commercially available. For example, the acrylamide may be a chemically pure product from Sinopharm Chemical Reagent Co., Ltd.

According to the present invention, as one of the reacting monomers, the 2-acrylamido-2-methyl propanesulfonic acid (AMPS) has advantages in that the 2-acrylamido-2-methyl propanesulfonic acid molecules have good thermostability and are resistant to hydrolysis owing to their steric hindrance; in addition, the molecules contain sulfonate groups (—$SO_3$—) and are insusceptible to interference of external acid, alkali, and saline ions. Therefore, the temperature-resistance and salinity tolerance properties of the settling of the slurry stabilizer are further improved, and the settling of the slurry stabilizer can be applied to high-temperature cementing better. In the present invention, the 2-acrylamido-2-methyl propanesulfonic acid (AMPS) is commercially available. For example, it may be an analytically pure product from Guangdong Weng Jiang Chemical Reagent Co., Ltd.

According to the present invention, as one of the reacting monomers, the N,N-dimethylacrylamide (DMAA) has advantages in that it can further improve the temperature-resistance and salinity resistance properties of the molecules and can improve filtrate loss reduction performance. In the present invention, the N,N-dimethylacrylamide is commercially available. For example, it may be an analytically pure product from Shandong Fengyuan Chemical Co., Ltd.

According to the present invention, the rigid hydrophobic monomer may be synthesized as required with experiment measures.

In the present invention, by improving the length of alkyl chains in the monomer, a rigid hydrophobic monomer is developed. The rigid hydrophobic monomer is a rigid hydrophobic long-chain alkyl monomer that contains quaternary ammonium salt, and can endow a thermal thickening feature to the synthetic polymer. Therefore, in the present invention, allyl chloride and N,N-dimethyl long-chain alkyl tertiary amine (the number of long-chain alkyl groups is an even number within a range of 14-20) are utilized to synthesize a rigid hydrophobic long-chain alkyl monomer that contains quaternary ammonium salt as the rigid hydrophobic monomer. Specifically, the synthesizing method is:

(1) loading fatty alcohol and a catalyst in an appropriate amount into a reactor, heating up the reactor, charging monomethyl amine at 35 kg/h-50 kg/h flow rate into the reactor for 75-85 min. at 130° C. temperature, and finally keeping the reaction temperature at 180-200° C. in the reactor for 5-7 h for reaction, so as to synthesize N,N-dimethyl long-chain alkyl tertiary amine (the number of long-chain alkyl groups is an even number with a range of 14-20);

(2) synthesizing quaternary amine from tertiary amine by charging a quaternary amination agent ($C_3H_5Cl$) into an enclosed vessel filled with tertiary amine, a small amount of alkaline liquor ($Na_2CO_3$), and an alcohol solvent (isopropanol) and keeping the materials at 75-90° C. reaction temperature at $3.0\times9.8\times10^4$ Pa to $3.5\times9.8\times10^4$ Pa reaction pressure for reaction.

The reaction formula is as follows:

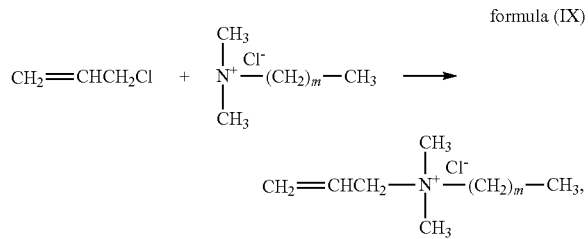

formula (IX)

wherein as the chain length of long-chain alkyl groups is increased (the m value is increased), the hydrophobic feature of the rigid hydrophobic monomer will be enhanced; further preferably, N,N-dimethyl long-chain alkyl tertiary amine with m is 15, 17, 19 or 21 is used to produce the rigid hydrophobic monomer.

In addition, in the present invention, owing to a fact that existing conventional temperature-sensitive monomers (e.g., N-isopropylacrylamide) have weak hydrophobicity, the synthesized polymer has a thermal thickening feature only at low temperatures (20-50° C.). To attain the goal of thickening at high temperature and non-thickening at low temperature, in the present invention, a rigid hydrophobic monomer containing long-chain alkyl groups, which has a stronger hydrophobic property, is used to synthesize the oil well cement settlement stabilizer.

In the present invention, both the allyl chloride and the N,N-dimethyl long-chain alkyl tertiary amine are commercially available. For example, the allyl chloride may be a chemically pure product from Jinan Renyuan Chemical Co., Ltd.; the N,N-dimethyl long-chain alkyl tertiary amine may be a chemically pure product from Shanghai Aladdin Bio-Chem Technology Co., Ltd.

In the present invention, the rigid hydrophobic monomer, especially, preferably the N,N-dimethyl long-chain alkyl quarternary ammonium salt with m is 15, 17, 19 or 21 selected as one of the reacting monomers in the present invention, has advantages in that the rigid hydrophobic monomer is a strongly hydrophobic N,N-dimethyl long-chain alkyl quarternary ammonium salt, which exhibits a strong hydrophobic property at low temperatures and has no detrimental effect to the thickness of the cement slurry; as the temperature is increased, the hydrophobic groups in the molecular chains begin to contract and accumulate, and the polymer molecules begin to accumulate and precipitate from the liquid phase, so that the viscosity of the solution is greatly increased, endowing a high-temperature thickening feature to the synthesized polymer. Thus, the problem of a narrow temperature adaptation range of conventional temperature-sensitive polymers is solved, the oil well cement settlement stabilizer still has settlement stability in a high-temperature environment, and the goal of "non-thickening at low temperature but thickening at high temperature" is attained truly.

AM-AMPS copolymers are applied in cement additives and oil-field chemical reagents owing to their excellent temperature-resistance and salt resistance properties, simple synthesis process, and low cost. However, AM-AMPS copolymers have a poor thermal thickening effect. Therefore, in the present invention, based on a copolymer, a rigid hydrophobic monomer is introduced, so that the synthesized polymer has a thermal thickening capability, i.e., the viscosity of the polymer is increased as the temperature is increased.

According to the present invention, preferably, the pH of the mixed solution mixed from the 2-acrylamido-2-methyl propanesulfonic acid, the acrylamide, the N,N-dimethylacrylamide, the rigid hydrophobic monomer, and the deionized water is 6-8;

According to the present invention, preferably, the pH of the mixed solution mixed from the 2-acrylamido-2-methyl propanesulfonic acid, the acrylamide, the rigid hydrophobic monomer, and the deionized water is 8-9;

Preferably, the conditions of the copolymerization reaction include: holding at 40-60° C. temperature for 6-8 h in still state for reaction; in the present invention, the pH of the reaction system may be adjusted with 10% NaOH solution to the target pH.

According to the present invention, the method is executed in the presence of an initiator, which may be sodium bisulfite and/or ammonium persulfate; the molar ratio of the dosed sodium bisulfite to the dosed ammonium persulfate is 1:(1.2-1.4), preferably is 1:(1.2-1.5), preferably is 1:1.2; more preferably, the total dose of the sodium bisulfite and the ammonium persulfate is 0.5-1 wt % of the total dose of the monomer A, the monomer B, the monomer D, and optionally the monomer C; even more preferably, the total dose of the sodium bisulfite and the ammonium persulfate is 0.5-1 wt % of the total dose of the 2-acrylamido-2-methyl propanesulfonic acid, the acrylamide, optionally the N,N-dimethylacrylamide, and the rigid hydrophobic monomer.

According to the present invention, all of the monomer A, the monomer B, the monomer D, and optionally the monomer C (e.g., the 2-acrylamido-2-methyl propanesulfonic acid, the acrylamide, optionally the N,N-dimethylacrylamide, and the rigid hydrophobic monomer) are dissolved in the deionized water and stirred to a homogeneous state to form a mixed solution, the pH of the mixed solution is adjusted, and then the mixed solution is loaded into a three-neck flask, the oxygen in the three-neck flask is expelled out, and the three-neck flask is placed in water bath at 50-60° C., preferably at 50° C. and stirred at 100-200 r/min. stirring rate, preferably at 100 r/min. constant stirring rate; when the temperature of the reaction solution is increased to 50-60° C., preferably to 50° C., the initiator is added by dropwise adding at 0.5-1.0 ml/min. dropwise adding rate to the mixed solution mixed from the 2-acrylamido-2-methyl propanesulfonic acid, the acrylamide, optionally the N,N-dimethylacrylamide, the rigid hydrophobic monomer, and the deionized water, the stirring is stopped after 30 min. when the reaction system begin to thicken, then the reaction system is held in still state for 6-8 h, preferably for 8 h; thus, a milk-white polymer is obtained; then, the polymer is purified and dried to obtain an oil well cement settlement stabilizer.

The oxygen in the reaction vessel may be expelled by charging nitrogen into the reaction vessel.

The purification may be performed with absolute ethyl alcohol for 1-6 times, preferably, for 3-6 times.

The drying may be performed in a thermostatic drying chamber, and there is no particular restriction on the drying time, as long as the product is dried. For example, the drying time may be 6-8 h, preferably is 8 h.

In a third aspect, the present invention provides cement slurry, which contains the quaternary oil well cement settlement stabilizer described above or the quaternary oil well cement settlement stabilizer prepared with the method described above.

Preferably, based on the total weight of the cement slurry, the dose of the quaternary cement settlement stabilizer of the oil well may be 0.4-0.8 wt %.

In a fourth aspect, the present invention provides cement slurry, which contains the ternary cement settlement stabilizer of the oil well described above or the ternary cement settlement stabilizer of the oil well prepared with the method described above.

Preferably, based on the total weight of the cement slurry, the dose of the ternary cement settlement stabilizer of the oil well may be 0.5-1.0 wt %.

In the present invention, there is no particular restriction on the formulation of the cement slurry. In other words, the formulation may be a conventional choice made by those skilled in the art. For example, the formulation of the high-temperature high-density cement slurry used in the test cases is composed of G-grade oil well cement+33% silicon powder+140% ilmenite+5% high-temperature filtrate reducer+0.5% THIX-558 anti-foamer+1.1% high-temperature setting retarder+68% water, and the density of the cement slurry is 2.50 g/cm$^3$.

In a fifth aspect, the present invention provides a use of the quaternary cement settlement stabilizer of the oil well described above, or the quaternary cement settlement stabilizer of the oil well prepared with the method described above, or the quaternary cement slurry described above in the field of oil and natural gas cementing engineering.

In a sixth aspect, the present invention provides a use of the ternary cement settlement stabilizer of the oil well described above, or the ternary cement settlement stabilizer of the oil well prepared with the method described above, or the ternary cement slurry described above in the field of oil and natural gas cementing engineering.

Preferably, the cementing is oriented to one or more of high-temperature deep wells, extra-deep wells, long horizontal traverse wells, and horizontal wells.

With the above-mentioned technical scheme, the present invention has the following advantages:

(1) The oil well cement settlement stabilizer provided in the present invention has no impact on the normal hydration reaction of the cement, can improve the compression strength of the set cement, reduce the API filtrate loss and free liquid in the cement slurry, and improve the overall properties of the cement slurry system.

(2) The oil well cement settlement stabilizer provided in the present invention has excellent workability, it can be directly mixed with cement, or directly added into water, mixed and used in a wet state, has high compatibility with other additives, and has high adaptability.

(3) The oil well cement settlement stabilizer provided in the present invention doesn't exert its thickening ability at low temperature because the molecular chains intertwine owing to the hydrophobic property of the material; as the temperature is increased, the molecular chains of the oil well cement settlement stabilizer will be further dissolved and stretch, forming more compact spatial mesh structures, and thereby the viscosity of the solution will be increased greatly; thus, the goal of "non-thickening at low temperature but thickening at high temperature" is attained, the cement slurry can be pumped normally at low temperature, and still has settlement stability at high temperature, and is applicable to high-temperature cementing operations in oil and natural gas exploration and development process.

(4) The process is simple and easy to operate, the polymerization reaction is easy to control, and the yield is high.

(5) By optimizing the components and contents of the oil well cement settling stabilizer, the present invention can make the components cooperate, so that the oil well cement settling stabilizer can not only be successfully applied in cementing settling prevention, but also have no adverse effects on other properties of the cement slurry, such as rheological property, initial consistency, thickening time, compressive strength, etc.

(6) The oil well cement settling stabilizer of the invention can be applied to cement slurry systems with different densities, and the use temperature is as high as 150° C.

Hereunder the present invention will be detailed in embodiments.

In the following embodiments and reference examples:

The properties of the cement slurry system is tested as per the standard GB/T 19139-2003 "Procedure for Testing Well Cements" with reference to the standards SY/T 6544-2003 "Property Requirements for Well Cement Slurries" and SY/T 6466-2000 "Evaluation Procedure for High-Temperature Property of Set Oil Well Cement".

The raw materials used in the examples and comparative examples are conventional commercial products, which are well known to those skilled in the art.

Example 1

This example is provided to describe the quaternary oil well cement settlement stabilizer prepared with the method provided in the present invention.

3 parts by weight 2-acrylamido-2-methyl propanesulfonic acid (monomer B), 8 parts by weight acrylamide (monomer A), 4 parts by weight N,N-dimethylacrylamide (monomer C), and 2 parts by weight rigid hydrophobic monomer (monomer D) were weighed and taken;

Wherein the rigid hydrophobic monomer has the structure represented by formula (VIII), and $R_6$ is H and m is 21;

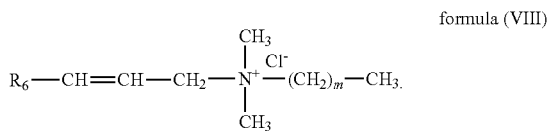

formula (VIII)

All of the four monomers were dissolved in 70 parts by weight deionized water and stirred to a homogeneous state to form a mixed solution, sodium hydroxide solution is added in an appropriate amount into the mixed solution at room temperature, the pH of the mixed solution is adjusted to 6.5, then the mixed solution is loaded into a reaction vessel, and the reaction vessel is placed in 55° C. thermostatic water bath, nitrogen is charged into the reaction vessel to expel the oxygen in the reaction vessel, the mixed solution in the reaction vessel is stirred with a stirrer and the temperature is kept at 55° C. constant temperature, 1.0% initiator solution that contains 1 part by weight sodium bisulfate and 1.2 parts by weight ammonium persulfate is added into the mixed solution, the resultant mixture is kept at the constant temperature for 6 h to obtain thick liquid, then the thick liquid is purified with absolute ethyl alcohol for 4 times, and then dried in a thermostatic drying chamber for 10 h; next, the obtained product is milled into a powder form; thus, a settlement stabilizer S1 is obtained.

The oil well cement settlement stabilizer S1 has the following structure: $[CH_2CM_1H]_x$—$[CM_2HCH_2]_y$—$[C_5H_9NO]_z$—$[CH_2CM_3HCl^-]_q$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;
wherein, x:y:z:q=1:0.13:0.36:0.04.

The weight-average molecular weight of the oil well cement settlement stabilizer S1 is 4,570,000.

Example 2

This example is provided to describe the quaternary oil well cement settlement stabilizer prepared with the method provided in the present invention.

6 parts by weight 2-acrylamido-2-methyl propanesulfonic acid, 20 parts by weight acrylamide, 10 parts by weight N,N-dimethylacrylamide, and 5 parts by weight rigid hydrophobic monomer 5 were weighed and taken;

All of the four monomers were dissolved in 65 parts by weight deionized water and stirred to a homogeneous state to form a mixed solution, sodium hydroxide solution is added in an appropriate amount into the mixed solution at room temperature, the pH of the mixed solution is adjusted to 6.5, then the mixed solution is loaded into a reaction vessel, and the reaction vessel is placed in 60° C. thermostatic water bath, nitrogen is charged into the reaction vessel to expel the oxygen in the reaction vessel, the mixed solution in the reaction vessel is stirred with a stirrer and the temperature is kept at 60° C. constant temperature, 1.0% initiator solution that contains 1 part by weight sodium bisulfate and 1.2 parts by weight ammonium persulfate is added into the mixed solution, the resultant mixture is kept at the constant temperature for 6 h to obtain thick liquid, then the thick liquid is purified with absolute ethyl alcohol for 4 times, and then dried in a thermostatic drying chamber for 12 h; next, the obtained product is milled into a powder form; thus, a settlement stabilizer S2 is obtained.

The oil well cement settlement stabilizer S2 has the following structure: $[CH_2CM_1H]_x$—$[CM_2HCH_2]_y$—$[C_5H_9NO]z$-$[CH_2CM_3HCl^-]_q$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;
wherein, x:y:z:q=1:0.1:0.36:0.04.

The weight-average molecular weight of the oil well cement settlement stabilizer S2 is 5,250,000.

Example 3

This example is provided to describe the quaternary oil well cement settlement stabilizer prepared with the method provided in the present invention.

4 parts by weight 2-acrylamido-2-methyl propanesulfonic acid, 15 parts by weight acrylamide, 7 parts by weight N,N-dimethylacrylamide, and 3.5 parts by weight rigid hydrophobic monomer were weighed and taken;

All of the four monomers were dissolved in 70 parts by weight deionized water and stirred to a homogeneous state to form a mixed solution, sodium hydroxide solution is added in an appropriate amount into the mixed solution at room temperature, the pH of the mixed solution is adjusted to 6.5, then the mixed solution is loaded into a reaction vessel, and the reaction vessel is placed in 55° C. thermostatic water bath, nitrogen is charged into the reaction vessel to expel the oxygen in the reaction vessel, the mixed solution in the reaction vessel is stirred with a stirrer and the temperature is kept at 55° C. constant temperature, 1.0% initiator solution that contains 1 part by weight sodium bisulfate and 1.2 parts by weight ammonium persulfate is added into the mixed solution, the resultant mixture is kept at the constant temperature for 6 h to obtain thick liquid, then the thick liquid is purified with absolute ethyl alcohol for 4 times, and then dried in a thermostatic drying chamber for 11 h; next, the obtained product is milled into a powder form; thus, a settlement stabilizer S3 is obtained.

The oil well cement settlement stabilizer S3 has the following structure: $[CH_2CM_1H]_x$—$[CM_2HCH_2]_y$—$[C_5H_9NO]_z$—$[CH_2CM_3HCl^-]_q$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;
Wherein, x:y:z:q=1:0.09:0.34:0.04.

The weight-average molecular weight of the oil well cement settlement stabilizer S3 is 4,860,000.

Example 4

This example is provided to describe the quaternary oil well cement settlement stabilizer prepared with the method provided in the present invention.

10 parts by weight 2-acrylamido-2-methyl propanesulfonic acid, 10 parts by weight acrylamide, 5 parts by weight N,N-dimethylacrylamide, and 2 parts by weight rigid hydrophobic monomer were weighed and taken;

All of the four monomers were dissolved in 70 parts by weight deionized water and stirred to a homogeneous state to form a mixed solution, sodium hydroxide solution is added in an appropriate amount into the mixed solution at room temperature, the pH of the mixed solution is adjusted to 7, then the mixed solution is loaded into a reaction vessel, and the reaction vessel is placed in 55° C. thermostatic water bath, nitrogen is charged into the reaction vessel to expel the oxygen in the reaction vessel, the mixed solution in the reaction vessel is stirred with a stirrer and the temperature is kept at 55° C. constant temperature, 1.0% initiator solution that contains 1 part by weight sodium bisulfite and 1.2 parts by weight ammonium persulfate is added into the mixed solution, the resultant mixture is kept at the constant temperature for 6 h to obtain thick liquid, then the thick liquid is purified with absolute ethyl alcohol for 4 times, and then dried in a thermostatic drying chamber for 12 h; next, the obtained product is milled into a powder form; thus, a settlement stabilizer S4 is obtained.

The oil well cement settlement stabilizer S4 has the following structure: $[CH_2CM_1H]_x$—$[CM_2HCH_2]_y$—$[C_5H_9NO]_z$—$[CH_2CM_3HCl^-]_q$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, x:y:z:q=1:0.34:0.36:0.03.

The weight-average molecular weight of the oil well cement settlement stabilizer S4 is 4,400,000.

Example 5

This example is provided to describe the quaternary oil well cement settlement stabilizer prepared with the method provided in the present invention.

An oil well cement settlement stabilizer is prepared with the method described in the example 1, but the rigid hydrophobic monomer has the structure represented by formula (VIII), and $R_6$ is H and m is 15.

Next, the obtained product oil well cement settlement stabilizer S5 is obtained.

The oil well cement settlement stabilizer S5 has the following structure: $[CH_2CM_1H]_x$—$[CM_2HCH_2]_y$—$[C_5H_9NO]_z$—$[CH_2CM_3HCl^-]_q$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, x:y:z:q=1:0.13:0.36:0.05.

The weight-average molecular weight of the oil well cement settlement stabilizer S5 is 4,220,000.

Example 6

This example is provided to describe the quaternary oil well cement settlement stabilizer prepared with the method provided in the present invention.

An oil well cement settlement stabilizer is prepared with the method described in the example 1, but the rigid hydrophobic monomer has the structure represented by formula (VIII), and $R_6$ is H and m is 17.

Next, the obtained product oil well cement settlement stabilizer S6 is obtained.

The oil well cement settlement stabilizer S6 has the following structure: $[CH_2CM_1H]_x$—$[CM_2HCH_2]_y$—$[C_5H_9NO]_z$—$[CH_2CM_3HCl^-]_q$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, x:y:z:q=1:0.13:0.36:0.047.

The weight-average molecular weight of the oil well cement settlement stabilizer S6 is 4,310,000.

Example 7

This example is provided to describe the quaternary oil well cement settlement stabilizer prepared with the method provided in the present invention.

An oil well cement settlement stabilizer is prepared with the method described in the example 1, but the rigid hydrophobic monomer has the structure represented by formula (VIII), and $R_6$ is H and m is 19.

Next, the obtained product oil well cement settlement stabilizer S7 is obtained.

The oil well cement settlement stabilizer S7 has the following structure: $[CH_2CM_1H]_x$—$[CM_2HCH_2]_y$—$[C_5H_9NO]_z$—$[CH_2CM_3HCl^-]_q$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, x:y:z:q=1:0.13:0.36:0.044.

The weight-average molecular weight of the oil well cement settlement stabilizer S7 is 4,380,000.

Example 8

This example is provided to describe the quaternary oil well cement settlement stabilizer prepared with the method provided in the present invention.

An oil well cement settlement stabilizer is prepared with the method described in the example 1, but the pH of the mixed solution is adjusted to 8, and the dosage of 2-acrylamido-2-methyl propanesulfonic acid, acrylamide, N,N-dimethylacrylamide and the rigid hydrophobic monomer should be adjusted accordingly.

next, the obtained product oil well cement settlement stabilizer S8 is obtained.

The oil well cement settlement stabilizer S8 has the following structure: $[CH_2CM_1H]_x$—$[CM_2HCH_2]_y$—$[C_5H_9NO]_z$—$[CH_2CM_3HCl^-]_q$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, x:y:z:q=1:0.11:0.28:0.04.

The weight-average molecular weight of the oil well cement settlement stabilizer S8 is 4,030,000.

Example 9

This example is provided to describe the ternary oil well cement settlement stabilizer prepared with the method provided in the present invention.

1 parts by weight 2-acrylamido-2-methyl propanesulfonic acid (monomer B), 3 parts by weight acrylamide (monomer A), and 1 parts by weight rigid hydrophobic monomer (monomer D) were weighed and taken;

Wherein the rigid hydrophobic monomer has the structure represented by formula (VIII), and $R_6$ is H and m is 21;

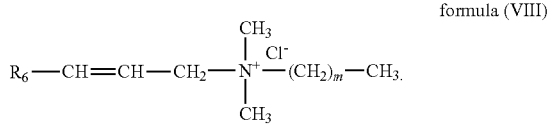

formula (VIII)

All of the monomers were dissolved in deionized water and stirred to a homogeneous state to form a mixed solution, 10% sodium hydroxide solution is added into the mixed solution at room temperature, the pH of the mixed solution is adjusted to 8.5, then the mixed solution is loaded into a reaction vessel three flasks, and the reaction vessel is placed in 50° C. thermostatic water bath, nitrogen is charged into the reaction vessel to expel the oxygen in the reaction vessel, the mixed solution in the reaction vessel is stirred with a stirrer at a constant speed of 100 r/minand, the temperature is kept at 50° C. constant temperature, 1.0% initiator solution that contains 1 part by weight sodium bisulfate and 1.2 parts by weight ammonium persulfate is added into the mixed solution, after 30 minutes, the reaction system began to increase viscosity and stop stirring, the resultant mixture is kept at the constant temperature for 10 h to obtain thick liquid, then the thick liquid is purified with absolute ethyl alcohol for 4 times, and then dried in a thermostatic drying chamber for 11 h; next, the obtained product is milled into a powder form; thus, a ternary settlement stabilizer S9 is obtained.

The ternary cement settlement stabilizer S9 has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, p:n:t=1:0.11:0.055.

The weight-average molecular weight of the oil well cement settlement stabilizer S9 is 3,500,000.

Example 10

This example is provided to describe the ternary oil well cement settlement stabilizer prepared with the method provided in the present invention.

A ternary oil well cement settlement stabilizer is prepared with the method described in the example 9, but the dosage of 2-acrylamido-2-methyl propanesulfonic acid, acrylamide, and the rigid hydrophobic monomer should be adjusted accordingly, that is, 2 parts by weight 2-acrylamido-2-methyl propanesulfonic acid (monomer B), 3 parts by weight acrylamide (monomer A), and 1 parts by weight rigid hydrophobic monomer (monomer D) were weighed and taken; next, the obtained product the ternary cement settlement stabilizer S10 is obtained.

The ternary cement settlement stabilizer S10 has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, p:n:t=1:0.22:0.055.

The weight-average molecular weight of the oil well cement settlement stabilizer S10 is 5,000,000.

Example 11

This example is provided to describe the ternary oil well cement settlement stabilizer prepared with the method provided in the present invention.

A ternary oil well cement settlement stabilizer is prepared with the method described in the example 9, but the dosage of 2-acrylamido-2-methyl propanesulfonic acid, acrylamide, and the rigid hydrophobic monomer should be adjusted accordingly, that is, 1 parts by weight 2-acrylamido-2-methyl propanesulfonic acid (monomer B), 3 parts by weight acrylamide (monomer A), and 2 parts by weight rigid hydrophobic monomer (monomer D) were weighed and taken; next, the obtained product the ternary cement settlement stabilizer S11 is obtained.

The ternary cement settlement stabilizer S11 has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, p:n:t=1:0.11:0.11.

The weight-average molecular weight of the oil well cement settlement stabilizer S11 is 4,500,000.

Example 12

This example is provided to describe the ternary oil well cement settlement stabilizer prepared with the method provided in the present invention.

A ternary oil well cement settlement stabilizer is prepared with the method described in the example 9, but the dosage of 2-acrylamido-2-methyl propanesulfonic acid, acrylamide, and the rigid hydrophobic monomer should be adjusted accordingly, that is, 1 parts by weight 2-acrylamido-2-methyl propanesulfonic acid (monomer B), 5 parts by weight acrylamide (monomer A), and 1 parts by weight rigid hydrophobic monomer (monomer D) were weighed and taken; next, the obtained product the ternary cement settlement stabilizer S12 is obtained.

The ternary cement settlement stabilizer S12 has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, p:n:t=1:0.07:0.03.

The weight-average molecular weight of the oil well cement settlement stabilizer S12 is 4,220,000.

Example 13

This example is provided to describe the ternary oil well cement settlement stabilizer prepared with the method provided in the present invention.

A ternary oil well cement settlement stabilizer is prepared with the method described in the example 9, but the rigid hydrophobic monomer has the structure represented by formula (VIII), and $R_6$ is H and m is 15.

Next, the obtained product the ternary cement settlement stabilizer S13 is obtained.

The ternary cement settlement stabilizer S13 has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, p:n:t=1:0.11:0.07.

The weight-average molecular weight of the oil well cement settlement stabilizer S13 is 3,630,000.

Example 14

This example is provided to describe the ternary oil well cement settlement stabilizer prepared with the method provided in the present invention.

A ternary oil well cement settlement stabilizer o is prepared with the method described in the example 9, but the rigid hydrophobic monomer has the structure represented by formula (VIII), and $R_6$ is H and m is 17.

Next, the obtained product the ternary cement settlement stabilizer S14 is obtained.

wherein the ternary cement settlement stabilizer S14 has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;

wherein, p:n:t=1:0.11:0.064.

The weight-average molecular weight of the oil well cement settlement stabilizer S14 is 3,780,000.

Example 15

This example is provided to describe the ternary oil well cement settlement stabilizer prepared with the method provided in the present invention.

A ternary oil well cement settlement stabilizer is prepared with the method described in the example 9, but the rigid hydrophobic monomer has the structure represented by formula (VIII), and $R_6$ is H and m is 19.

Next, the obtained product the ternary cement settlement stabilizer S15 is obtained.

The ternary cement settlement stabilizer S15 has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;
wherein, p:n:t=1:0.11:0.059.

The weight-average molecular weight of the oil well cement settlement stabilizer S15 is 4,030,000.

Example 16

This example is provided to describe the ternary oil well cement settlement stabilizer prepared with the method provided in the present invention.

A ternary oil well cement settlement stabilizer is prepared with the method described in the example 9, but the pH of the mixed solution is adjusted to 9, and the dosage of 2-acrylamido-2-methyl propanesulfonic acid, acrylamide, and the rigid hydrophobic monomer should be adjusted accordingly.

Next, the obtained product the ternary cement settlement stabilizer S16 is obtained.

The ternary cement settlement stabilizer S16 has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;
wherein, p:n:t=1:0.08:0.048.

The weight-average molecular weight of the oil well cement settlement stabilizer S16 is 3,830,000.

Comparative Example 1

An oil well cement settlement stabilizer is prepared with the method described in example 1, but: hydroxyethyl cellulose is used as the settlement stabilizer. Thus, an oil well cement settlement stabilizer DS1 is obtained.

Comparative Example 2

An oil well cement settlement stabilizer is prepared with the method described in example 1, but: Xanthan gum is used as the settlement stabilizer. Thus, an oil well cement settlement stabilizer DS2 is obtained.

Comparative Example 3

An oil well cement settlement stabilizer is prepared with the method described in example 1, but: hydroxypropylguar gum is used as the settlement stabilizer. Thus, an oil well cement settlement stabilizer DS3 is obtained.

Comparative Example 4

An oil well cement settlement stabilizer is prepared with the method described in example 1, but: the weight ratio of 2-acrylamido-2-methyl propanesulfonic acid to acrylamide to N,N-dimethylacrylamide and to the rigid hydrophobic monomer is 1:5:5:3. Thus, an oil well cement settlement stabilizer DS4 is obtained.

Comparative Example 5

An oil well cement settlement stabilizer is prepared with the method described in example 1, but: the dosage of 2-acrylamido-2-methyl propanesulfonic acid, acrylamide, N,N-dimethylacrylamide and the rigid hydrophobic monomer made the weight-average molecular weight of the oil well cement settlement stabilizer DS5 is 1,750,000. Thus, an oil well cement settlement stabilizer DS5 is obtained.

Comparative Example 6

An oil well cement settlement stabilizer is prepared with the method described in example 1, but: the dosage of 2-acrylamido-2-methyl propanesulfonic acid, acrylamide, N,N-dimethylacrylamide and the rigid hydrophobic monomer made the weight-average molecular weight of the oil well cement settlement stabilizer DS6 is 1,450,000. Thus, an oil well cement settlement stabilizer DS6 is obtained.

Comparative Example 7

An oil well cement settlement stabilizer is prepared with the method described in example 9, but: hydroxyethyl cellulose is used as the settlement stabilizer. Thus, an oil well cement settlement stabilizer DS7 is obtained.

Comparative Example 8

An oil well cement settlement stabilizer is prepared with the method described in example 9, but: AM/AMPS copolymer is used as the settlement stabilizer. Thus, an oil well cement settlement stabilizer DS8 is obtained.

Comparative Example 9

An oil well cement settlement stabilizer is prepared with the method described in example 9, but: Xanthan gum is used as the settlement stabilizer. Thus, an oil well cement settlement stabilizer DS9 is obtained.

Comparative Example 10

An oil well cement settlement stabilizer is prepared with the method described in example 9, but: the weight ratio of 2-acrylamido-2-methyl propanesulfonic acid to acrylamide and to the rigid hydrophobic monomer is 1:5:4. Thus, an oil well cement settlement stabilizer DS10 is obtained.

Comparative Example 11

An oil well cement settlement stabilizer is prepared with the method described in example 9, but: the dosage of 2-acrylamido-2-methyl propanesulfonic acid, acrylamide, and the rigid hydrophobic monomer made the cement settlement stabilizer has the following structure: $[CH_2CM_1H]_p$—$[CM_2HCH_2]_n$—$[CH_2CM_3HCl^-]_t$; wherein $M_1$ is —$CONH_2$, $M_2$ is —$CONHC(CH_3)_2CH_2SO_3H$, and $M_3$ is —$[CH_2N(CH_3)_2(CH_2)_mCH_3]^+$;
wherein, p:n:t=1:0.01:0.01. Thus, an oil well cement settlement stabilizer DS11 is obtained.

Comparative Example 12

An oil well cement settlement stabilizer is prepared with the method described in example 9, but: the dosage of 2-acrylamido-2-methyl propanesulfonic acid, acrylamide and the rigid hydrophobic monomer made the weight-average molecular weight of the oil well cement settlement stabilizer DS12 is 1,550,000. Thus, an oil well cement settlement stabilizer DS12 is obtained.

Test Case 1

The quaternary oil well cement settlement stabilizer o described in the example 1 is prepared at different concentration values (0.6 wt %, 0.4 wt %, and 0.2 wt %), the apparent viscosity of each oil well cement settlement stabilizer is measured with a six-speed rotational viscometer (from Qingdao HaiTongDa Special Purpose Instrument Co., Ltd.), the shearing rate is 170.3 $s^{-1}$, the temperature is controlled by means of water bath, and the rate of temperature increased is controlled to 1° C./min. The results are shown in FIG. 1.

It is seen from FIG. 1: the 0.6 wt % oil well cement settlement stabilizer and 0.4 wt % oil well cement settlement stabilizer in the example 1 have a thermoviscosifying feature, and the thermoviscosifying feature effect becomes more obvious as the concentration of oil well cement settlement stabilizer is increased. The high-temperature rheological curve of the 0.2 wt % oil well cement settlement stabilizer is very smooth, and the apparent viscosity doesn't vary essentially as the temperature is increased. The test is carried out up to 82° C. only. Viewed from the trend of the curve of apparent viscosity of the 0.6 wt % oil well cement settlement stabilizer vs. temperature, the thermoviscosifying effect of the oil well cement settlement stabilizer lasts above 82° C.

Test Case 2

3 wt % in mass fraction quaternary cement settlement stabilizer of the oil well described in the example 1 is prepared, the apparent viscosity of the 3 wt % oil well cement settlement stabilizer is measured with a high-temperature rheometer, the shearing rate is 732.4 $s^{-1}$, the temperature is controlled by means of water bath within a range of room temperature to 260° C., the rate of temperature increase is controlled to 2° C./min. The result is shown in FIG. 2.

Figure 2:
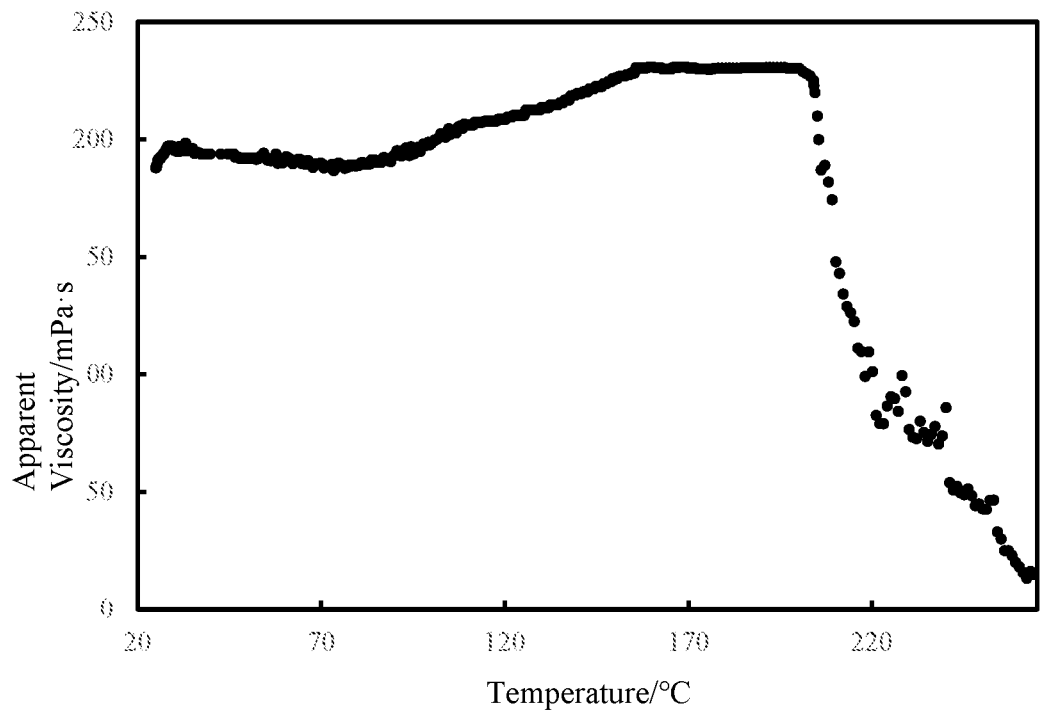
FIG. 2 shows the rheological curve of the 3 wt % quaternary cement settlement stabilizer of the oil well in example 1 of the present invention.

It is seen from FIG. 2: at 732.4 $s^{-1}$ shearing rate, the 3 wt % oil well cement settlement stabilizer in the example 1 doesn't have an obvious thickening effect at low temperature; the apparent viscosity is increased gradually as the temperature is increased, the maximum temperature range is 165-200° C.; within that temperature range, the oil well cement settlement stabilizer always has high viscosity within a range of 220-230 mPa. s. That indicates the oil well cement settlement stabilizer in the present invention has an excellent temperature-resistance property up to 200° C., and is applicable to well cementing operations in deep wells and extra-deep wells.

Test Case 3

0-0.8% in mass fraction quaternary cement settlement stabilizer of the oil well described in example 1 is added into a high-temperature and high-density cement slurry system, wherein the high-temperature filtrate reducer and the high-temperature setting retarder used in the cement slurry were from Sinopec Shengli Well Cementing Co., Ltd. The properties of the cement slurry system, including the initial consistency of cement slurry, thickening time, API filtrate loss, quantity of free liquid, compression strength, and difference in density between the upper part and the lower part of cement slurry, were tested as per the standard GB/T 19139-2003 "Procedure for Testing Well Cements" with reference to the standards SY/T 6544-2003 "Property Requirements for Well Cement Slurries" and SY/T 6466-2000 "Evaluation Procedure for High-Temperature Property of Set Oil Well Cement". The curing temperature is 150° C., and the curing time is 24 h. Wherein the difference in density between the upper part and the lower part of cement slurry is evaluated with the following method: the high-temperature and high-density cement slurry is stirred for 20 min at 150° C. in a thickening instrument and cured for 2.5 h at 90° C. Then the density of the upper part and the density of the lower part were measured, and the density difference is calculated. The settlement stability is deemed good if the difference in density between the upper part and the lower part is smaller than or equal to 0.03 g/cm$^3$. The result is shown in Table 1—Influence of Dose of Oil Well Cement Settlement Stabilizer on the Properties of Cement Slurry.

TABLE 1

| No. | Dose of settlement stabilizer/ % | Initial consistency/ Bc | Thickening Time/min. | API filtrate loss/ mL | Volume of free liquid/ mL | Compression Strength/ MPa | Difference in density between the upper part and the lower part of cement slurry/(g/cm3) |
|---|---|---|---|---|---|---|---|
| 1 | 0   | 19   | 184 | 39.7 | 1.6 | 50.6 | 0.733 |
| 2 | 0.2 | 19   | 185 | 29.3 | 0.5 | 52.3 | 0.048 |
| 3 | 0.4 | 19.5 | 186 | 24.5 | 0.3 | 53.8 | 0.029 |
| 4 | 0.6 | 20   | 187 | 22.2 | 0.1 | 54.9 | 0.024 |
| 5 | 0.8 | 21   | 189 | 22.6 | 0.2 | 52.3 | 0.018 |

It is seen from the experimental result shown in Table 1: the oil well cement settlement stabilizer in the present invention doesn't increase the initial consistency of the high-temperature cement slurry significantly, and doesn't have obvious influence on the thickening time; besides, both the API filtrate loss and the volume of free liquid in the high-temperature and high-density cement slurry are decreased obviously, indicating that the oil well cement settlement stabilizer has certain filtrate loss reducing capability. In addition, at 0.4%-0.8% dose, the oil well cement settlement stabilizer in the present invention improves the compression strength of the set cement, decrease the difference in density between the upper part and the lower part of the cement slurry, and improves overall properties of the cement slurry.

Test Case 4

0.6 wt % in mass fraction quaternary oil well cement settlement stabilizer solution described in example 1, 0.6 wt % hydroxyethyl cellulose solution described in comparative example 1, 0.6 wt % xanthan gum solution described in comparative example 2, and 0.6 wt % hydroxypropylguar gum solution described in comparative example 3 were prepared respectively; the apparent viscosity of each solution is measured with a six-speed rotational viscometer (from Qingdao HaiTongDa Specific Purpose Instrument Co., Ltd.); the shearing rate is $732.45^{-1}$, the temperature is controlled by means of water bath, and the rate of temperature increase is controlled to 5° C./min. The results are shown in FIG. 3.

Figure 3:
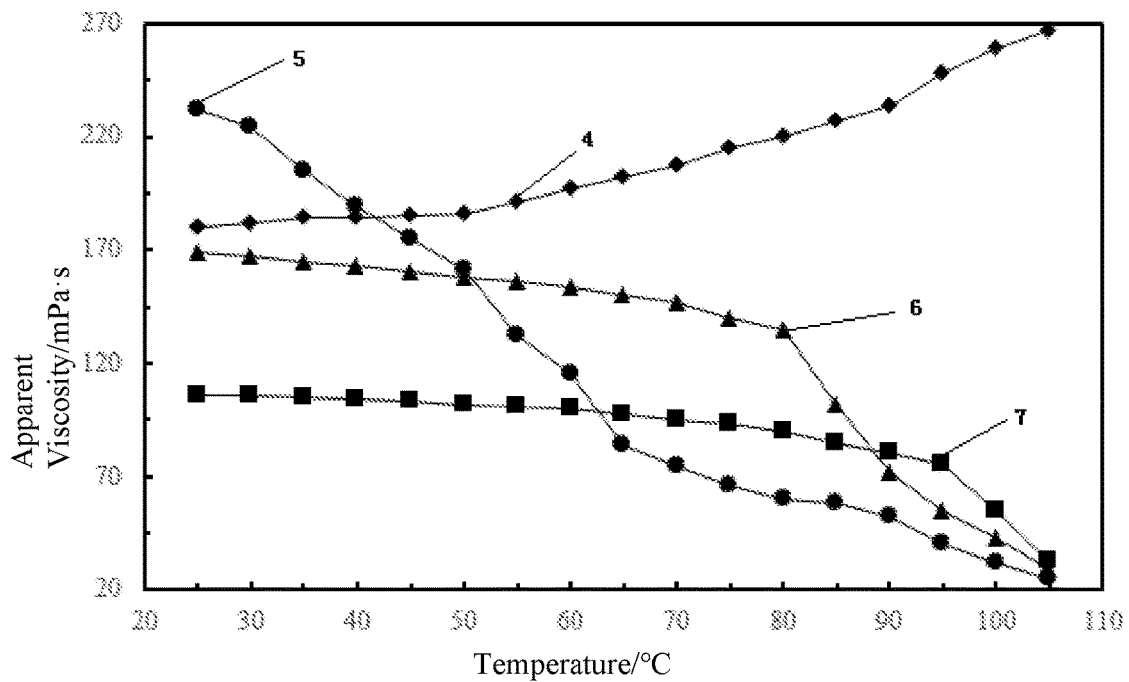
FIG. 3 shows rheological curves of different types of the quaternary cement settlement stabilizer of the oil well in the same content.

It is seen from FIG. 3: the oil well cement settlement stabilizer solution has a thermoviscosifying feature. It has the lowest apparent viscosity at normal temperature (20~50° C.); after the temperature reaches to a specific value, the viscosity of the solution will be increased gradually as the temperature is increased; the hydroxyethyl cellulose solution, the xanthan gum solution, and the hydroxypropylguar gum solution exhibit high viscosity at normal temperature, but the viscosity is decreased rapidly as the temperature is increased; the order of the apparent viscosity values at normal temperature (25° C.) is: 0.6 wt % hydroxypropylguar gum solution <0.6 wt % xanthan gum solution <0.6 wt % oil well cement settlement stabilizer solution <0.6 wt % hydroxyethyl cellulose solution; the order of the apparent viscosity values at high temperature (80° C.) is: 0.6 wt % hydroxyethyl cellulose solution <0.6 wt % xanthan gum solution <0.6 wt % hydroxypropylguar gum solution <0.6 wt % oil well cement settlement stabilizer solution.

In summary, hydroxyethyl cellulose, xanthan gum, and hydroxypropylguar gum can effectively improve the apparent viscosity of the liquid phase at normal temperature, but have little thermoviscosifying effect at high temperature; in contrast, the oil well cement settlement stabilizer provided in the present invention attain a thermoviscosifying effect.

Test Case 5

The quaternary oil well cement settlement stabilizer in the example 1 is milled into powder, then the mass loss and the curve of thermoelectric potential difference vs. temperaturewere measured with a thermogravimetric analyzer TG209F3 (from NETZ SCH-Geratebau GmbH). The result is shown in FIG. 4.

Figure 4:
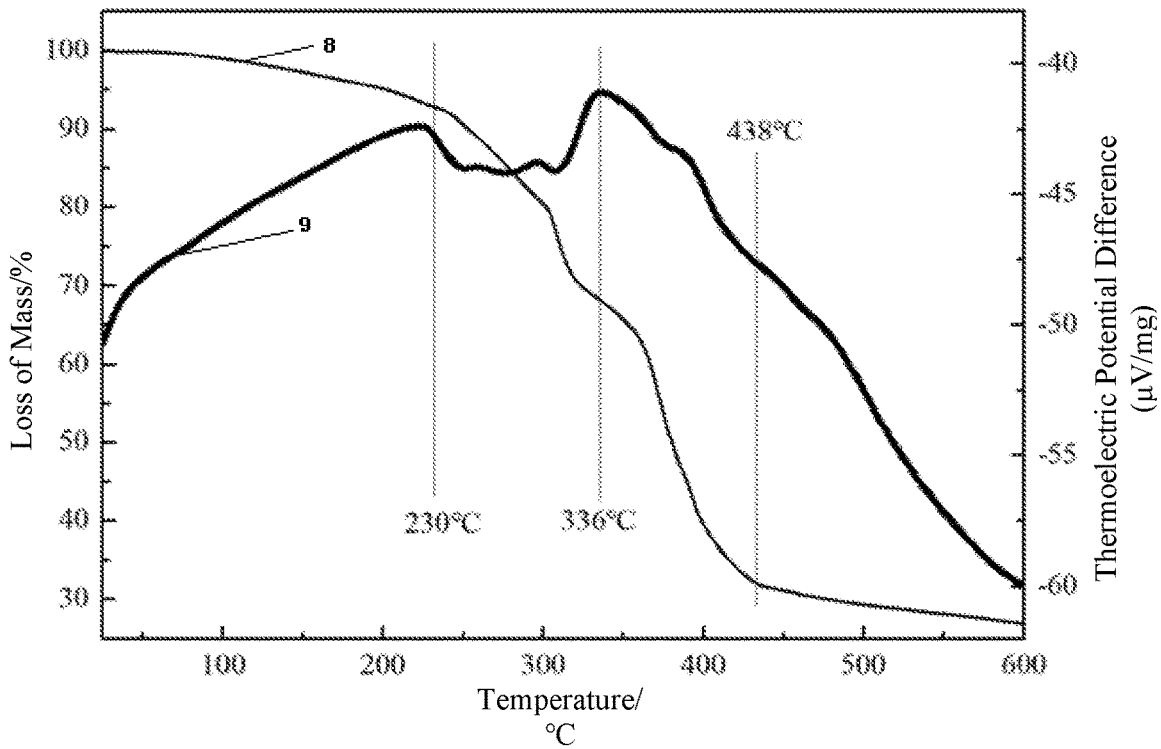
FIG. 4 shows thermogravimetric curve and differential thermal curve of the quaternary cement settlement stabilizer of the oil well in example 1 of the present invention.

It is seen FIG. 4: the thermogravimetric curve and the differential thermal curve of the oil well cement settlement stabilizer may be divided into 4 stages: the first stage is 25° C.-230° C., in which both the thermogravimetric curve and the differential thermal curve vary smoothly and slowly, and the weight loss of the polymer is about 7.3 wt %, mainly resulted from evaporation of the water content; the second stage is 230° C.-336° C., in which the weight of the polymer is decreased obviously, the weight loss is about 26.3 wt %, and an obvious endothermic peak appears in the differential thermal curve, mainly because the oxygen-containing groups, such as amide and sulfonic acid, etc., in the oil well cement settlement stabilizer start to decompose under the heat; the third stage is 336° C.-438° C., in which the weight loss is further aggravated, the weight loss is about 39.4 wt %, and the differential thermal curve declines obviously as the temperature is increased, indicating that the main chains of the oil well cement settlement stabilizer start to break, and the polymer molecules start to decompose completely; the fourth stage is 438° C. and above, in which the weight of the oil well cement settlement stabilizer powder tends to stabilize, indicating that the polymer molecules have been decomposed completely and only about 27.5 wt % carbon-based residues were left. Therefore, the oil well cement settlement stabilizer synthesized in the present invention has outstanding thermostability and can ensure integrity of the molecular structures at temperatures up to 230° C.

Test Case 6

High-temperature and high-density cement slurry is prepared according to the formulation, and the high-temperature filtrate reducer and high-temperature setting retarder used in the preparation were from Sinopec Shengli Well Cementing Co., Ltd. Wherein the cement slurry in which no settlement stabilizer is added is denoted as cement slurry A, and the cement slurries prepared by directly mixing the quaternary oil well cement settlement stabilizer described in the example 1 and the comparative examples 1-3 with the powder material in dry state weredenoted as cement slurries S1, DS1, DS2, and DS3 respectively. The properties of the cement slurries, including the initial consistency of cement slurry, thickening time, API filtrate loss, quantity of free liquid, compression strength, and difference in density between the upper part and the lower part of cement slurry, were tested as per the standard GB/T 19139-2003 "Procedure for Testing Well Cements" with reference to the standards SY/T 6544-2003 "Property Requirements for Well Cement Slurries" and SY/T 6466-2000 "Evaluation Procedure for High-Temperature Property of Set Oil Well Cement", to evaluate the influences of different settlement stabilizers on the properties of the cement slurries. Wherein the difference in density between the upper part and the lower part of cement slurry is evaluated with the following method: the high-temperature high-density cement slurry is stirred at 30° C. for 20 min. in a thickening instrument and cured for 2.5 h at room temperature; then, the density of the upper part of the cement slurry and the density of the lower part of the cement slurry were measured, and the difference in density between the upper part and the lower part of the cement slurry is calculated; the high-temperature and high-density cement slurry is stirred for 20 min. at 100° C., 150° C., and 200° C. in a thickening instrument respectively and cured for 2.5 h at 90° C. Then the density of the upper part and the density of the lower part were measured, and the density difference is calculated. The settlement stability is deemed good if the difference in density between the upper part and the lower part is smaller than or equal to 0.03 $g/cm^3$. The result is shown in Table 2—Influences of Different Settlement Stabilizers on the Properties of Cement Slurry.

TABLE 2

| Formulation of cement slurry (g) | | | | | | |
|---|---|---|---|---|---|---|
| High-temperature and high-density cement slurry | | A | S1 | DS1 | DS2 | DS3 |
| Oil well cement settlement stabilizer | | 0 | 0.6 | 0 | 0 | 0 |
| Hydroxyethyl cellulose | | 0 | 0 | 0.6 | 0 | 0 |
| Hydroxypropylguar gum | | 0 | 0 | 0 | 0.6 | 0 |
| Xanthan gum | | 0 | 0 | 0 | 0 | 0.6 |
| Properties of cement slurry | | | | | | |
| Consistency/Bc | 30° C. | 21 | 21 | 34 | 33 | 32 |
|  | 100° C. | 14 | 21 | 14 | 13 | 14 |
|  | 150° C. | 7 | 20 | 11 | 8 | 7 |
|  | 200° C. | 6 | 17 | 7 | 6 | 6 |
| Thickening Time/min. | 30° C. | 325 | 345 | 363 | 378 | 470 |
|  | 100° C. | 218 | 221 | 223 | 232 | 240 |
|  | 150° C. | 183 | 189 | 187 | 195 | 225 |
|  | 200° C. | 154 | 165 | 167 | 178 | 191 |
| API filtrate loss/mL | | 39.7 | 22.2 | 22.6 | 24.3 | 29.5 |
| Volume of free liquid/mL | | 1.6 | 0.1 | 0.2 | 0.3 | 1.3 |
| Compression strength/ MPa | 30° C. | 43.5 | 45 | 45.3 | 44.3 | 42.3 |
|  | 100° C. | 53.2 | 55.7 | 54.2 | 48.5 | 43.5 |
|  | 150° C. | 50.6 | 54.9 | 50.2 | 54.3 | 42.4 |
|  | 200° C. | 42.5 | 44.5 | 42 | 38 | 36.7 |

TABLE 2-continued

| | | | | | | |
|---|---|---|---|---|---|---|
| Difference in density between the upper part and the lower part of cement slurry (g/cm$^3$) | 30° C. | 0.122 | 0.006 | 0.027 | 0.025 | 0.012 |
| | 100° C. | 0.334 | 0.009 | 0.135 | 0.198 | 0.053 |
| | 150° C. | 0.733 | 0.012 | 0.412 | 0.468 | 0.347 |
| | 200° C. | 0.789 | 0.022 | 0.677 | 0.568 | 0.489 |

It is seen from the experimental result in Table 2:

(1) The quaternary oil well cement settlement stabilizer in the present invention doesn't increase the initial consistency of the cement slurry at normal temperature (e.g., at 30° C. temperature), but it attains a thickening effect at high temperature (e.g., at 100° C., 150° C., or 200° C. temperature) and keeps the consistency of the cement slurry within a reasonable range, and is helpful for preventing settlement of the cement slurry. In contrast, hydroxyethyl cellulose, hydroxypropylguar gum, and xanthan gum increase the initial consistency of the cement slurry at normal temperature and degrade the rheology property of the cement slurry (e.g., at 30° C. temperature), and are adverse to pumping of the cement slurry; the consistency of the cement slurry is decreased obviously and there is no obvious thickening effect at high temperature (e.g., at 100° C., 150° C., or 200° C.). Therefore, it is difficult to attain an effect of improving settlement stability.

(2) In addition, the thickening time of the cement in which the oil well cement settlement stabilizer or the hydroxyethyl cellulose is added has no obvious change as the temperature is increased; in contrast, hydroxypropylguar gum and xanthan gum prolongs the thickening time of the cement obviously, and have impact on the normal hydration reaction of the cement. Therefore, the oil well cement settlement stabilizer in the present invention can attain the goal of "non-thickening at low temperature but thickening at high temperature", and can effectively improve the settlement stability of the cement slurry.

(3) Though all of the four settlement stabilizers (the oil well cement settlement stabilizer provided in the present invention, hydroxyethyl cellulose, hydroxypropylguar gum, and xanthan gum) can reduce API filtrate loss and quantity of free liquid, they are in the following order when sorted by the efficacy: oil well cement settlement stabilizer>hydroxyethyl cellulose>hydroxypropylguar gum>xanthan gum. Therefore, the experimental result proves that the oil well cement settlement stabilizer provided in the present invention has outstanding filtrate loss reduction performance, and can effectively improve overall properties of the cement slurry.

(4) The compression strength of the set cement is decreased as the temperature is increased when the temperature is above 100° C., regardless of whether the oil well cement settlement stabilizer is added or not. At the same temperature, the oil well cement settlement stabilizer provided in the present invention and hydroxyethyl cellulose can slightly improve the compression strength of the set cement, while hydroxypropylguar gum and xanthan gum obviously decrease the compression strength of the set cement and therefore are unsuitable for use in high-temperature and high-pressure deep well environments.

(5) At normal temperature (e.g., at 30° C. temperature), all of the four settlement stabilizers (the oil well cement settlement stabilizer provided in the present invention, hydroxyethyl cellulose, hydroxypropylguar gum, and xanthan gum) can decrease the difference in density between the upper part and the lower part of the cement slurry; at high temperature (e.g., at 100° C., 150° C., or 200° C. temperature), only the oil well cement settlement stabilizer provided in the present invention can obviously decrease the difference in density between the upper part and the lower part of the cement slurry and meet the settlement stability criterion as well. Therefore, the oil well cement settlement stabilizer provided in the present invention can attain an settlement stabilization effect at normal temperature and high temperature, has a wide effective temperature range and an excellent temperature resistance property up to 200° C.

In summary, from the application effects, the oil well cement settlement stabilizer S1 in the present invention has no detrimental effect to the overall properties of the cement slurry, can improve the high temperature stability and filtrate reduction capability of the cement slurry, and ensure the quality of cementing work. The oil well cement settlement stabilizer provided in the present invention has good application prospects in well cementing operations for special wells, such as deep high-temperature wells, long horizontal traverse wells, and horizontal wells, etc.

Test Case 7

The test is carried out with the same method as that in the test case 6, wherein the cement slurry in which no oil well cement settlement stabilizer is added is denoted as cement slurry A; the difference lies in: the cement slurries prepared by directly mixing the oil well cement settlement stabilizers in the examples 2-8 and the comparative examples 4-6 with the powder material in dry state were denoted as cement slurries S2-S8 and DS4-DS6. The result is shown in Table 3—Influences of Different Oil Well Cement Settlement Stabilizers on the Properties of Cement Slurry.

TABLE 3

| Formulation of cement slurry (g) | | | | | | | | | | | |
|---|---|---|---|---|---|---|---|---|---|---|---|
| | A | S2 | S3 | S4 | S5 | S6 | S7 | S8 | DS4 | DS5 | DS6 |
| High-temperature and high-density cement slurry | | | | | | | | | | | |
| Oil well cement settlement stabilizer | 0 | 0.6 | 0.6 | 0.6 | 0.6 | 0.6 | 0.6 | 0.6 | 0.6 | 0.6 | 0.6 |
| Properties of cement slurry | | | | | | | | | | | |
| Consistency/Bc | 30° C. | 21 | 21 | 21 | 21 | 25 | 24 | 23 | 25 | 30 | 33 | 31 |
| | 100° C. | 14 | 21 | 20 | 19 | 17 | 18 | 19 | 17 | 21 | 22 | 20 |
| | 150° C. | 7 | 20 | 19 | 18 | 16 | 17 | 17 | 16 | 10 | 9 | 8 |
| | 200° C. | 6 | 18 | 19 | 18 | 15 | 16 | 16 | 15 | 7 | 6 | 6 |
| Thickening Time/min. | 30° C. | 325 | 335 | 345 | 351 | 363 | 260 | 356 | 368 | 420 | 431 | 452 |
| | 100° C. | 218 | 221 | 228 | 232 | 235 | 232 | 230 | 239 | 285 | 288 | 290 |
| | 150° C. | 183 | 185 | 189 | 192 | 187 | 188 | 189 | 185 | 235 | 221 | 246 |
| | 200° C. | 154 | 160 | 162 | 165 | 157 | 160 | 162 | 152 | 211 | 205 | 228 |

TABLE 3-continued

| | | | | | | | | | | | |
|---|---|---|---|---|---|---|---|---|---|---|---|
| Compression strength/MPa | 30° C. | 43.5 | 45 | 44.8 | 44.6 | 43.9 | 44.0 | 44.2 | 43.5 | 43.4 | 43.2 | 43.0 |
| | 100° C. | 53.2 | 55.3 | 54.9 | 54.7 | 54.2 | 54.3 | 54.4 | 53.4 | 53.0 | 52.8 | 52.5 |
| | 150° C. | 50.6 | 54.7 | 54.4 | 54.0 | 53.0 | 53.3 | 53.5 | 51.6 | 48.7 | 45.6 | 41.3 |
| | 200° C. | 42.5 | 44.3 | 43.7 | 43.1 | 42.8 | 42.9 | 42.8 | 37.9 | 34.9 | 33.1 |
| Difference in density between the upper part and the lower part of cement slurry (g/cm³) | 30° C. | 0.122 | 0.005 | 0.009 | 0.01 | 0.013 | 0.012 | 0.011 | 0.015 | 0.012 | 0.015 | 0.018 |
| | 100° C. | 0.334 | 0.004 | 0.005 | 0.007 | 0.010 | 0.010 | 0.009 | 0.019 | 0.089 | 0.168 | 0.177 |
| | 150° C. | 0.733 | 0.089 | 0.011 | 0.015 | 0.020 | 0.017 | 0.015 | 0.022 | 0.286 | 0.340 | 0.356 |
| | 200° C. | 0.789 | 0.015 | 0.018 | 0.021 | 0.026 | 0.023 | 0.022 | 0.03 | 0.356 | 0.422 | 0.431 |

It is seen from the experimental result in Table 3:

(1) In the aspect of consistency, the oil well cement settlement stabilizers S2-S8 in the present invention don't increase the initial consistency of the cement slurry at normal temperature (e.g., at 30° C. temperature), but they attain a thickening effect at high temperature (e.g., at 100° C., 150° C., or 200° C. temperature) and keeps the consistency of the cement slurry within a reasonable range. In contrast, the oil well cement settlement stabilizers in the comparative examples 4-6 increase the initial consistency of the cement slurry at normal temperature and degrade the rheology property of the cement slurry (e.g., at 30° C. temperature), and are adverse to pumping of the cement slurry; the consistency of the cement slurry is decreased obviously and there is no obvious thickening effect at high temperature (e.g., at 100° C., 150° C., or 200° C.). Therefore, it is difficult to attain an effect of improving settlement stability.

(2) In the aspect of thickening time, the thickening time of the cement in which any of the oil well cement settlement stabilizers S2-S8 is added has no obvious change as the temperature is increased; in contrast, the oil well cement settlement stabilizers in the comparative examples 4-6 prolong the thickening time of the cement obviously, and have impact on the normal hydration reaction of the cement. Therefore, the oil well cement settlement stabilizer in the present invention can attain the goal of "non-thickening at low temperature but thickening at high temperature", and can effectively improve the settlement stability of the cement slurry.

(3) The compression strength of the set cement is decreased as the temperature is increased when the temperature is above 100° C., regardless of whether the oil well cement settlement stabilizer is added or not. At the same temperature, the oil well cement settlement stabilizers provided in the present invention can slightly improve the compression strength of the set cement, while the oil well cement settlement stabilizers in the comparative examples 4-6 obviously decrease the compression strength of the set cement and therefore are unsuitable for use in high-temperature and high-pressure deep well environments.

(4) At normal temperature (e.g., at 30° C. temperature), all of the oil well cement settlement stabilizers S2-S8 and the oil well cement settlement stabilizers in the comparative examples 4-6 can decrease the difference in density between the upper part and the lower part of the cement slurry; at high temperature (e.g., at 100° C., 150° C., or 200° C. temperature), only the oil well cement settlement stabilizers S2-S8 provided in the present invention can obviously decrease the difference in density between the upper part and the lower part of the cement slurry and meet the settlement stability criterion as well. Therefore, the oil well cement settlement stabilizer provided in the present invention can attain an settlement stabilization effect at normal temperature and high temperature, has a wide effective temperature range and an excellent temperature resistance property up to 200° C.

In summary, from the application effects, the oil well cement settlement stabilizers S2-S8 in the present invention has no detrimental effect to the overall properties of the cement slurry, can improve the high temperature stability of the cement slurry, and ensure the quality of cementing work. The oil well cement settlement stabilizer provided in the present invention has good application prospects in well cementing operations for special wells, such as deep high-temperature wells, long horizontal traverse wells, and horizontal wells, etc.

Test Case 8

The ternary oil well cement settlement stabilizer described in the example 9 is prepared at different concentration values (0.4 wt %, and 0.2 wt %), the apparent viscosity of each oil well cement settlement stabilizer is measured with a six-speed rotational viscometer (from Qingdao HaiTongDa Special Purpose Instrument Co., Ltd.), the shearing rate is 170.3 s$^{-1}$, the temperature is controlled by means of water bath, and the rate of temperature increased is controlled to 1° C./min. The results are shown in FIG. 5.

Figure 5:
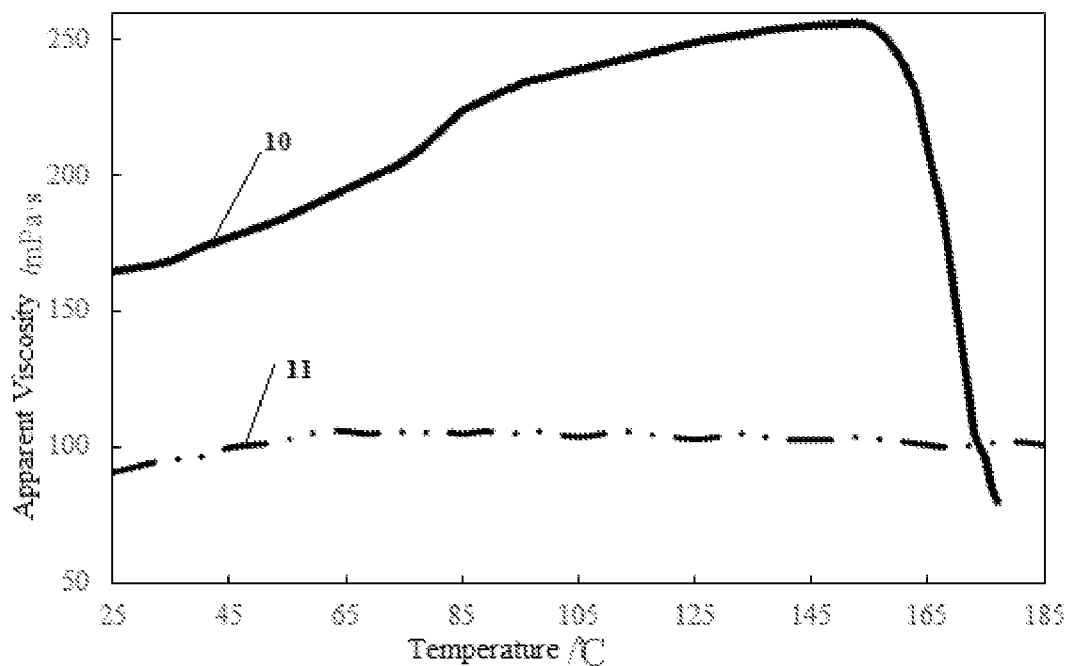
FIG. 5 shows rheological curves of the ternary cement settlement stabilizer of the oil well at different concentration values in example 9 of the present invention.

It is seen from FIG. 5: the rheological curve of 0.4 wt % ternary oil well cement settling stabilizer solution increases with the increase of temperature, and the apparent viscosity of the solution increases first and then decreases, which indicates that the ternary oil well cement settling stabilizer has a strong thermoviscosifying effect at a higher concentration. The rheological curves of 0.2 wt % ternary oil well cement settlement stabilizer solution at high temperature are very smooth, and the apparent viscosity does not change with the increase of temperature. This shows that the oil well ternary cement settlement stabilizer can also show a certain thermoviscosifyingproperty at low concentration, so that the apparent viscosity of polymer solution will not decrease significantly at high temperature. In addition, as can be seen from FIG. 5, the temperature resistance of the ternary cement settling stabilizer of the oil well of the present invention is as high as 150 C, which can meet the requirements of high temperature cementing.

Test Case 9

0.6 wt % in mass fraction ternary oil well cement settlement stabilizer solution described in example 9, 0.6 wt % hydroxyethyl cellulose solution described in comparative example 7, 0.6 wt % AM/AMPS copolymer solution described in comparative example 8, and 0.6 wt % xanthan gum solution described in comparative example 9 were prepared respectively; the apparent viscosity of each solution is measured with a six-speed rotational viscometer (from Qingdao HaiTongDa Specific Purpose Instrument Co., Ltd.); the shearing rate is 732.4 s$^{-1}$, the temperature is controlled by means of water bath, and the rate of temperature increase is controlled to 5° C./min. The results are shown in FIG. 6.

Figure 6:
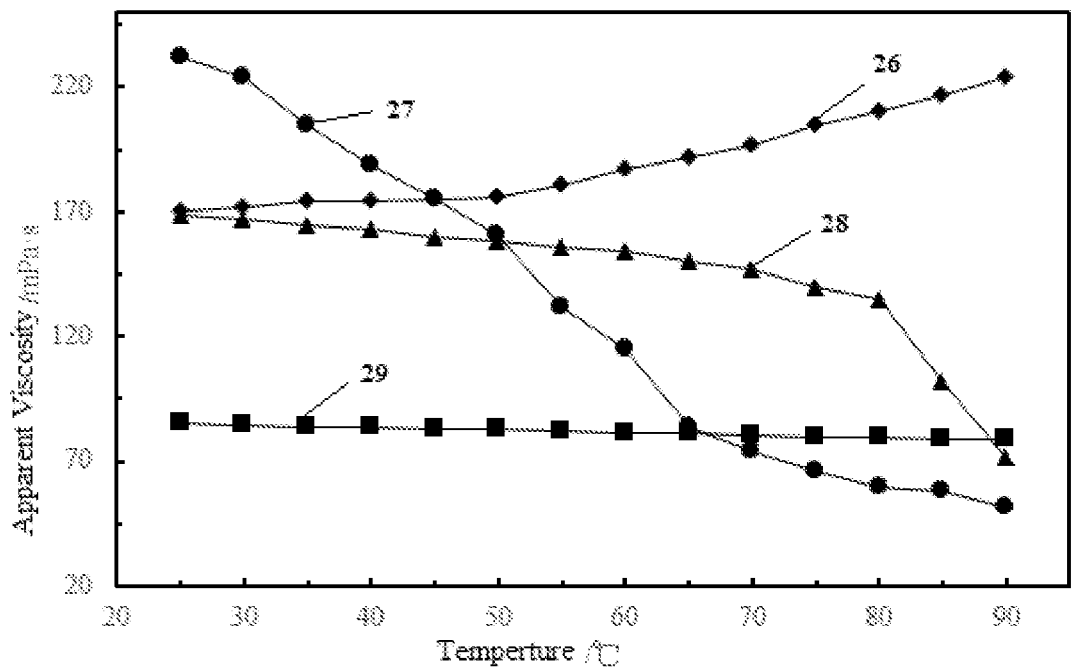
FIG. 6 shows the rheological curve of the 0.6 wt % ternary cement settlement stabilizer of the oil well with different concentrations of NaOH added in example 9 of the present invention.

It is seen from FIG. 6: the ternary oil well cement settlement stabilizer solution has a thermoviscosifying feature. It has the lowest apparent viscosity at normal temperature (2050° C.); after the temperature reaches to a specific value, the viscosity of the solution will be increased gradually as the temperature is increased; the hydroxyethyl cellulose solution and the xanthan gum solution exhibit high viscosity at normal temperature, but the viscosity is decreased rapidly as the temperature is increased; the apparent viscosity of AM/AMPS copolymer solution does not change with temperature and keeps at about 80 mPa s. the order of the apparent viscosity values at normal temperature (25° C.) is: 0.6 wt % AM/AMPS copolymer solution <0.6 wt % xanthan gum solution ≈0.6 wt % oil well cement settlement stabilizer solution <0.6 wt % hydroxyethyl cellulose solution; the order of the apparent viscosity values at high temperature (80° C.) is: 0.6 wt % hydroxyethyl cellulose solution <0.6 wt % xanthan gum solution <0.6 wt % AM/AMPS copolymer solution <0.6 wt % oil well cement settlement stabilizer solution.

In summary, hydroxyethyl cellulose and xanthan gum can effectively improve the apparent viscosity of the liquid phase at normal temperature, but have little viscosifying effect at high temperature; in contrast, the ternary cement settlement stabilizer of the oil well provided in the present invention attain a thermoviscosifying effect.

Test Case 10

Because oil well cement slurry is weak alkaline (pH is usually 9-13), it is necessary to evaluate the alkaline resistance of the synthesized oil well cement settling stabilizer to determine whether it can show thickening effect in cement slurry. Firstly, the oil well cement settling stabilizer described in Example 9 with a mass fraction of 0.6% is prepared, and then NaOH with a mass fraction of 0.01%, 0.1%, 1% and 4% is added to the solution respectively (the corresponding relationship between NaOH concentration and pH value is shown in Table 4). Then, the rheology of each group of polymer solution is evaluated by using a six-speed rotary viscometer (Qingdao Haitongda Special Instrument Co., Ltd.). The results are shown in FIG. 7.

TABLE 4

| NaOH concentration/% | pH |
|---|---|
| 0.01 | 11.4 |
| 0.1 | 12.4 |
| 1 | 13.4 |
| 4 | 14 |

Figure 7:
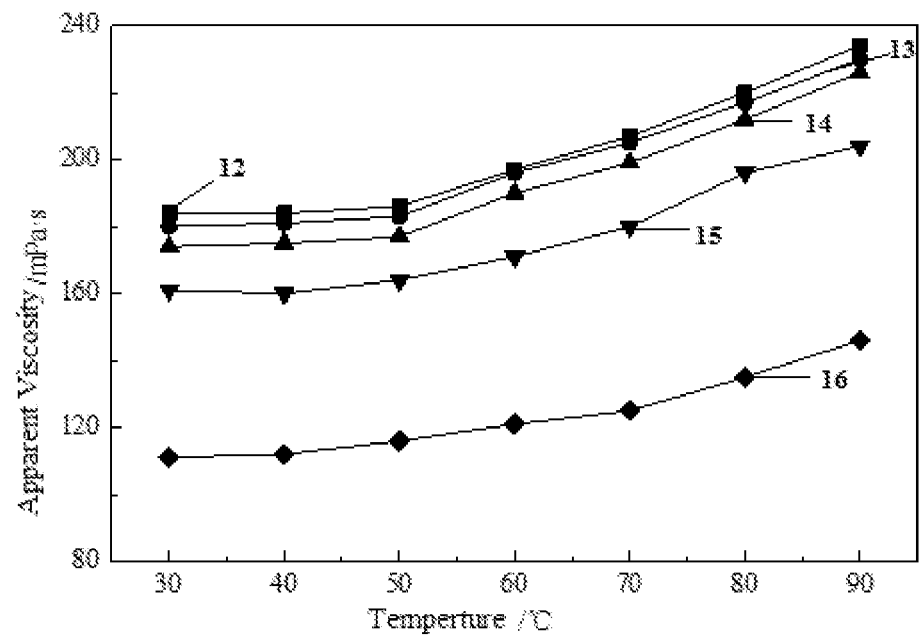
FIG. 7 shows the rheological curve of the 0.6 wt % ternary cement settlement stabilizer of the oil well with different concentrations of NaCl added in example 9 of the present invention.

As can be seen from FIG. 7, when NaOH concentration is 0.01% and 0.1%, the viscosifying effect of oil well cement settling stabilizer is almost unaffected. When NaOH concentration is increased to 1%, the apparent viscosity of oil well cement settling stabilizer solution begins to decrease, but the decrease is small. When the concentration of NaOH reaches 4%, the apparent viscosity of oil well cement settlement stabilizer solution begins to decrease significantly. When the concentration of NaOH is 1%, the corresponding pH value is 13.4, which is higher than that of normal oil well cement slurry (9-13). Therefore, the oil well cement settling stabilizer synthesized by the present invention has sufficient alkali resistance and is completely applicable to the weak alkaline environment of oil well cement slurry.

Test Case 11

The oil well cement settling stabilizer described in Example 9 with a mass fraction of 0.6% is prepared, and then NaCl with a mass fraction of 0.05%, 0.2%, 0.65% and 3% is added to the solution (the corresponding relationship between NaCl concentration and salinity is shown in Table 5), so that the solution corresponds to the median salinity of fresh water, brackish water (weak mineralized water), brackish water (medium mineralized water) and brine water (strong mineralized water), respectively. The rheological properties of polymer solutions were evaluated by six-speed rotating viscometer (Qingdao Haitongda Special Instrument Co., Ltd.). The results are shown in FIG. 8.

TABLE 5

| NaCl concentration/% | Salinity/(g/L) | Water type |
|---|---|---|
| 0.05 | 0.5 | Fresh water |
| 0.2 | 2 | Light Salt water |
| 0.65 | 6.5 | Salt water |
| 3 | 30 | Strong Salt water |

Figure 8:
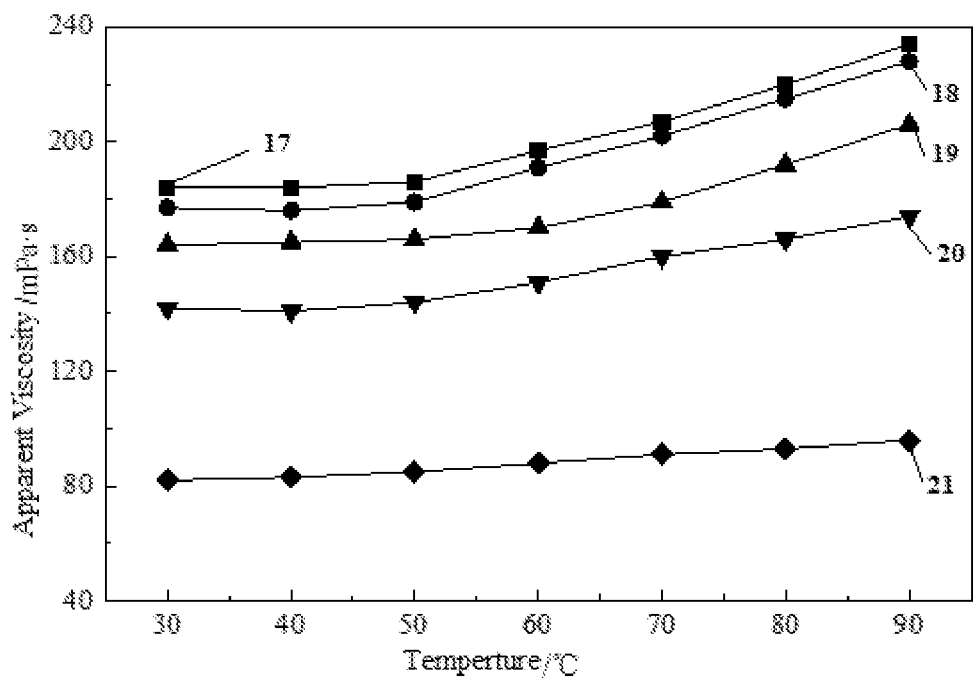
FIG. 8 shows the consistency curve of the cement slurry with different content of the ternary cement stabilizer in oil well with time.

From FIG. 8, it can be seen that the apparent viscosity of oil well cement settlement stabilizer solution decreases gradually with the increase of NaCl concentration at various temperatures. When NaCl is less than 0.65% in mass fraction, the viscosity of oil well cement settlement stabilizer solution decreases slightly. When NaCl concentration reaches 3% in mass fraction, the viscosity of oil well cement settlement stabilizer solution begins to decrease significantly, and the thermoviscosifying effect is also inhibited. The results show that the oil well cement settling stabilizer has certain salt resistance, can be used in cooperation with inorganic salt additives of certain concentration, and can be used for slurry mixing in cementing field with fresh water, brackish water and saline water.

Test Case 12

Figure 9:
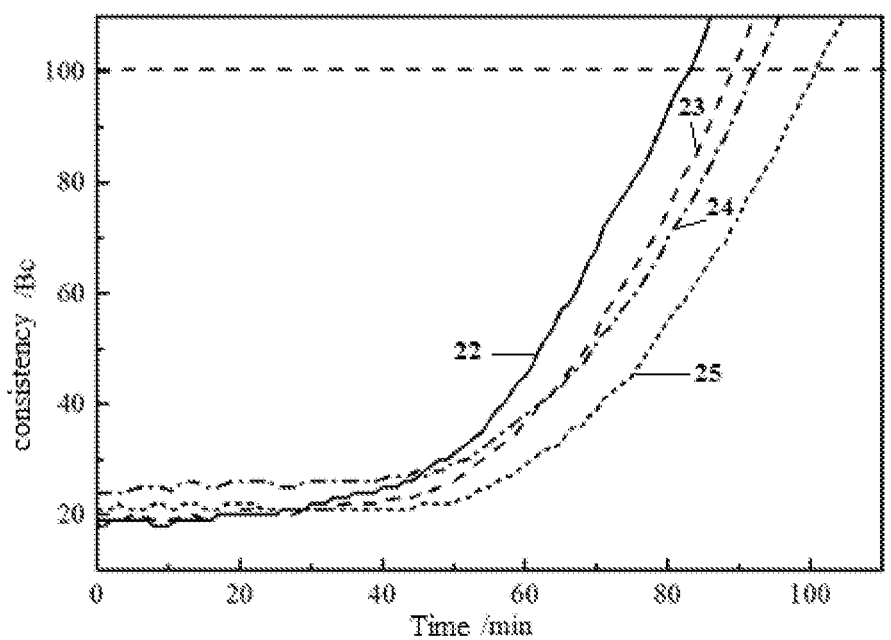
FIG. 9 shows the rheological curves of the ternary cement settlement stabilizers with the same content and different types.

The ternary oil well cement settling stabilizer described in example 9 is added into G grade cement slurry in proportion of 0.025, 0.05 and 0.1 weight percent. The influence of the ternary cement settling stabilizer on cement slurry thickening time is tested by atmospheric pressure thickener. The thickening temperature remains constant at 75° C. The test thickening curve is shown in FIG. 9. The thickening time and initial consistency are summarized as shown in Table 6. The effect of the agent on the thickening time of cement slurry is shown.

TABLE 6

| cement | Water cement ratio | Settlement stabilizer/% | Initial consistency/Bc | Thickening time/min |
|---|---|---|---|---|
| G grade cement slurry | 0.44 | 0 | 18.0 | 83 |
| G grade cement slurry | 0.44 | 0.025 | 19.1 | 89 |
| G grade cement slurry | 0.44 | 0.05 | 24.4 | 92 |
| G grade cement slurry | 0.44 | 0.1 | 21.1 | 100 |

It can be seen from FIG. 9 and table 6 that the thickening time of G-grade cement slurry without oil well cement settlement stabilizer is 83 minutes at 75~C, while the thickening time of G-grade cement slurry will be prolonged to 89 minutes, 92 minutes and 100 minutes with the addition of 0.025%, 0.05% and 0.1% oil well cement settlement stabilizer respectively, that is, the thickening time of cement slurry will be prolonged with the increase of oil well cement settlement stabilizer. Cement settling stabilizer has certain retarding effect. In addition, by comparing the initial consistency, it can be seen that the oil well cement settling stabilizer has no adverse effect on the initial consistency of cement slurry.

Test Case 13

High-temperature and high-density cement slurry is prepared according to the formulation, and the high-temperature filtrate reducer and high-temperature setting retarder used in the preparation were from Sinopec Shengli Well Cementing Co., Ltd. Wherein the cement slurry in which no settlement stabilizer is added is denoted as cement slurry A, and the cement slurries prepared by directly mixing the quaternary cement settlement stabilizer of the oil well described in the example 9 and the comparative examples 7-9 with the powder material in dry state were denoted as cement slurries S9, DS7, DS8, and DS9 respectively. The properties of the cement slurries, including the initial consistency of cement slurry, thickening time, API filtrate loss, quantity of free liquid, compression strength, and difference in density between the upper part and the lower part of cement slurry, were tested as per the standard GB/T 19139-2003 "Procedure for Testing Well Cements" with reference to the standards SY/T 6544-2003 "Property Requirements for Well Cement Slurries" and SY/T 6466-2000 "Evaluation Procedure for High-Temperature Property of Set Oil Well Cement", to evaluate the influences of different settlement stabilizers on the properties of the cement slurries. Wherein the difference in density between the upper part and the lower part of cement slurry is evaluated with the following method: the high-temperature high-density cement slurry is stirred at 30° C. for 20 min. in a thickening instrument and cured for 2.5 h at room temperature; then, the density of the upper part of the cement slurry and the density of the lower part of the cement slurry were measured, and the difference in density between the upper part and the lower part of the cement slurry is calculated; the high-temperature and high-density cement slurry is stirred for 20 min. at 100° C., 150° C., and 200° C. in a thickening instrument respectively and cured for 2.5 h at 90° C. Then the density of the upper part and the density of the lower part were measured, and the density difference is calculated. The settlement stability is deemed good if the difference in density between the upper part and the lower part is smaller than or equal to 0.03 g/cm³. The result is shown in Table 7—Influences of Different Settlement Stabilizers on the Properties of Cement Slurry.

TABLE 7

| Formulation of cement slurry (g) | | | | | |
|---|---|---|---|---|---|
| | A | S9 | DS7 | DS8 | DS9 |
| High-temperature and high-density cement slurry | | | | | |
| Oil well cement settlement stabilizer | 0 | 0.6 | 0 | 0 | 0 |
| Hydroxyethyl cellulose | 0 | 0 | 0.6 | 0 | 0 |
| AM/AMPS copolymer | 0 | 0 | 0 | 0.6 | 0 |
| Xanthan gum | 0 | 0 | 0 | 0 | 0.6 |
| Properties of cement slurry | | | | | |
| Thickness/Bc | 30° C. | 21 | 21 | 34 | 27 | 32 |
| | 100° C. | 14 | 21 | 14 | 16 | 14 |
| | 135° C. | 10 | 19 | 11 | 9 | 7 |
| | 150° C. | 7 | 18 | 10 | 8 | 6 |
| Thickening Time/min. | 30° C. | 325 | 345 | 363 | 388 | 470 |
| | 100° C. | 218 | 221 | 223 | 242 | 240 |
| | 135° C. | 183 | 189 | 187 | 205 | 225 |
| | 150° C. | 154 | 165 | 167 | 187 | 191 |

TABLE 7-continued

| Compression strength/MPa | 30° C. | 43.5 | 43.9 | 45.3 | 44.3 | 42.3 |
|---|---|---|---|---|---|---|
| | 100° C. | 53.2 | 52.5 | 54.2 | 43.75 | 43.5 |
| | 135° C. | 50.6 | 51.0 | 50.2 | 39.2 | 42.4 |
| | 150° C. | 42.5 | 42.6 | 42 | 36.8 | 36.7 |
| Difference in density between the upper part and the lower part of cement slurry (g/cm³) | 30° C. | 0.122 | 0.008 | 0.027 | 0.025 | 0.012 |
| | 100° C. | 0.334 | 0.007 | 0.135 | 0.198 | 0.053 |
| | 135° C. | 0.652 | 0.018 | 0.237 | 0.317 | 0.169 |
| | 150° C. | 0.733 | 0.024 | 0.412 | 0.468 | 0.347 |

It is seen from the experimental result in Table 7:

(1) The ternary oil well cement settlement stabilizer in the present invention doesn't increase the initial consistency of the cement slurry at normal temperature (e.g., at 30° C. temperature), but it attains a thickening effect at high temperature (e.g., at 100° C., 135° C., or 150° C. temperature) and keeps the consistency of the cement slurry within a reasonable range, and is helpful for preventing settlement of the cement slurry. In contrast, hydroxyethyl cellulose, AM/AMPS copolymer, and xanthan gum increase the initial consistency of the cement slurry at normal temperature and degrade the rheology property of the cement slurry (e.g., at 30° C. temperature), and are adverse to pumping of the cement slurry; the consistency of the cement slurry is decreased obviously and there is no obvious thickening effect at high temperature (e.g., at 100° C., 135° C., or 150° C.). Therefore, it is difficult to attain an effect of improving settlement stability.

(2) In addition, the thickening time of the cement in which the ternary cement settlement stabilizer or the hydroxyethyl cellulose is added has no obvious change as the temperature is increased; in contrast, AM/AMPS copolymer and xanthan gum prolongs the thickening time of the cement obviously, and have impact on the normal hydration reaction of the cement. Therefore, the ternary cement settlement stabilizer in the present invention can attain the goal of "non-thickening at low temperature but thickening at high temperature", and can effectively improve the settlement stability of the cement slurry.

(3) The compression strength of the set cement is decreased as the temperature is increased when the temperature is above 100° C., regardless of whether the ternary cement settlement stabilizer is added or not. At the same temperature, the ternary cement settlement stabilizer provided in the present invention and hydroxyethyl cellulose can slightly improve the compression strength of the set cement, while AM/AMPS copolymer and xanthan gum obviously decrease the compression strength of the set cement and therefore are unsuitable for use in high-temperature and high-pressure deep well environments.

(4) At normal temperature (e.g., at 50° C. temperature), all of the four settlement stabilizers (the ternary cement settlement stabilizer provided in the present invention, hydroxyethyl cellulose, AM/AMPS copolymer, and xanthan gum) can decrease the difference in density between the upper part and the lower part of the cement slurry; at high temperature (e.g., at 100° C., 135° C., or 150° C. temperature), only the ternary cement settlement stabilizer provided in the present invention can obviously decrease the difference in density between the upper part and the lower part of the cement slurry and meet the settlement stability criterion as well. Therefore, the ternary cement settlement stabilizer provided in the present invention can attain an settlement stabilization effect at normal temperature and high temperature, has a wide effective temperature range and an excellent temperature resistance property up to 150° C.

In summary, from the application effects, the ternary cement settlement stabilizer S9 in the present invention has no detrimental effect to the overall properties of the cement slurry, can improve the high temperature stability and filtrate reduction capability of the cement slurry, and ensure the quality of cementing work. The oil well cement settlement stabilizer provided in the present invention has good application prospects in well cementing operations for special wells, such as deep high-temperature wells, long horizontal traverse wells, and horizontal wells, etc.

Test Case 14

The test is carried out with the same method as that in the test case 12, wherein the cement slurry in which no ternary cement settlement stabilizer is added is denoted as cement slurry A; the difference lies in: the cement slurries prepared by directly mixing the oil well cement settlement stabilizers in the examples 10-16 and the comparative examples 10-12 with the powder material in dry state were denoted as cement slurries S10-S16 and DS10-DS12. The result is shown in Table 8—Influences of Different ternary Cement Settlement Stabilizers on the Properties of Cement Slurry.

temperature (e.g., at 100° C., 135° C., or 150° C.). Therefore, it is difficult to attain an effect of improving settlement stability.

(2) In the aspect of thickening time, the thickening time of the cement in which any of the ternary cement settlement stabilizers S10-S16 is added has no obvious change as the temperature is increased; in contrast, the oil well cement settlement stabilizers in the comparative examples 10-12 prolong the thickening time of the cement obviously, and have impact on the normal hydration reaction of the cement. Therefore, the oil well cement settlement stabilizer in the present invention can attain the goal of "non-thickening at low temperature but thickening at high temperature", and can effectively improve the settlement stability of the cement slurry.

(3) The compression strength of the set cement is decreased as the temperature is increased when the temperature is above 100° C., regardless of whether the ternary cement settlement stabilizer is added or not. At the same temperature, the ternary cement settlement stabilizers provided in the present invention S10-S16 can slightly improve the compression strength of the set cement, while the oil well cement settlement stabilizers in the comparative

TABLE 8

| | | \multicolumn{11}{c}{Formulation of cement slurry (g)} |
|---|---|---|---|---|---|---|---|---|---|---|---|
| High-temperature and high-density cement slurry | | A | S10 | S11 | S12 | S13 | S14 | S15 | S16 | DS10 | DS11 | DS12 |
| ternary cement settlement stabilizer | | 0 | 0.6 | 0.6 | 0.6 | 0.6 | 0.6 | 0.6 | 0.6 | 0.6 | 0.6 | 0.6 |
| | | \multicolumn{11}{c}{Properties of cement slurry} |
| Thickness/Bc | 30° C. | 21 | 21 | 22 | 21 | 21 | 21 | 22 | 22 | 30 | 33 | 31 |
| | 100° C. | 14 | 21 | 22 | 24 | 23 | 25 | 24 | 24 | 21 | 22 | 19 |
| | 135° C. | 10 | 20 | 19 | 19 | 19 | 18 | 18 | 18 | 16 | 15 | 14 |
| | 150° C. | 7 | 19 | 19 | 18 | 18 | 18 | 18 | 19 | 11 | 13 | 12 |
| Thickening Time/min. | 30° C. | 325 | 345 | 356 | 366 | 370 | 385 | 377 | 388 | 410 | 421 | 442 |
| | 100° C. | 218 | 221 | 235 | 244 | 245 | 256 | 251 | 254 | 289 | 278 | 297 |
| | 135° C. | 183 | 189 | 191 | 196 | 198 | 213 | 208 | 211 | 235 | 221 | 246 |
| | 150° C. | 154 | 171 | 180 | 183 | 185 | 197 | 189 | 192 | 211 | 205 | 228 |
| Compression strength/MPa | 30° C. | 43.5 | 43.9 | 44.1 | 44.0 | 43.8 | 43.5 | 43.9 | 43.8 | 43.6 | 43.8 | 43.5 |
| | 100° C. | 53.2 | 54.3 | 54.2 | 54.0 | 53.8 | 53.3 | 53.5 | 53.7 | 52.3 | 51.7 | 51.1 |
| | 135° C. | 50.6 | 51.0 | 50.6 | 50.6 | 50.7 | 50.9 | 50.9 | 50.7 | 45.2 | 48.1 | 40.5 |
| | 150° C. | 42.5 | 44.1 | 43.6 | 43.4 | 44.0 | 42.6 | 43.5 | 43.9 | 35.6 | 37.9 | 33.3 |
| Difference in density between the upper part and the lower part of cement slurry/ (g/cm$^3$) | 30° C. | 0.122 | 0.008 | 0.009 | 0.009 | 0.008 | 0.009 | 0.008 | 0.011 | 0.019 | 0.018 | 0.010 |
| | 100° C. | 0.334 | 0.004 | 0.005 | 0.006 | 0.007 | 0.015 | 0.009 | 0.013 | 0.178 | 0.169 | 0.096 |
| | 135° C. | 0.652 | 0.015 | 0.017 | 0.019 | 0.015 | 0.020 | 0.019 | 0.020 | 0.332 | 0.313 | 0.288 |
| | 150° C. | 0.733 | 0.021 | 0.025 | 0.027 | 0.026 | 0.028 | 0.023 | 0.029 | 0.421 | 0.403 | 0.369 |

It is seen from the experimental result in Table 8:

(1) In the aspect of consistency, the oil well cement settlement stabilizers S10-S16 in the present invention don't increase the initial consistency of the cement slurry at normal temperature (e.g., at 30° C. temperature), but they attain a thickening effect at high temperature (e.g., at 100° C., 135° C., or 150° C. temperature) and keeps the consistency of the cement slurry within a reasonable range. In contrast, the oil well cement settlement stabilizers in the comparative examples 10-12 increase the initial consistency of the cement slurry at normal temperature and degrade the rheology property of the cement slurry (e.g., at 30° C. temperature), and are adverse to pumping of the cement slurry; the consistency of the cement slurry is decreased obviously and there is no obvious thickening effect at high examples 10-12 obviously decrease the compression strength of the set cement and therefore are unsuitable for use in high-temperature and high-pressure deep well environments.

(4) At normal temperature (e.g., at 30° C. temperature), all of the ternary cement settlement stabilizers S10-S16 and the oil well cement settlement stabilizers in the comparative examples 10-12 can decrease the difference in density between the upper part and the lower part of the cement slurry; at high temperature (e.g., at 100° C., 135° C., or 150° C. temperature), only the oil well cement settlement stabilizers S10-S16 provided in the present invention can obviously decrease the difference in density between the upper part and the lower part of the cement slurry and meet the settlement stability criterion as well. Therefore, the ternary cement settlement stabilizer provided in the present invention can attain an settlement stabilization effect at normal temperature and high temperature, has a wide effective temperature range and an excellent temperature resistance property up to 150° C.

In summary, from the application effects, the ternary cement settlement stabilizers S10-S16 in the present invention has no detrimental effect to the overall properties of the cement slurry, can improve the high temperature stability of the cement slurry, and ensure the quality of cementing work. The oil well cement settlement stabilizer provided in the present invention has good application prospects in well cementing operations for special wells, such as deep high-temperature wells, long horizontal traverse wells, and horizontal wells, etc.

Moreover, different examples of the present invention may also be combined freely as required, as long as the combinations don't deviate from the ideal and spirit of the present invention. However, such combinations shall also be deemed as falling into the scope disclosed in the present invention.

The invention claimed is:

1. A well cementing cement slurry comprising an oil well cement settlement stabilizer, the oil well cement settlement stabilizer comprising a quaternary cement settlement stabilizer;
   wherein the quaternary cement settlement stabilizer contains structural units A represented by formula (I), structural units B represented by formula (II), structural units C represented by formula (III), and structural units D represented by formula (IV); wherein the molar ratio of the structural units A to the structural units B to the structural units C to the structural units D is x:y:z:q=1:(0.09-0.34):(0.28-0.36):(0.03-0.05);

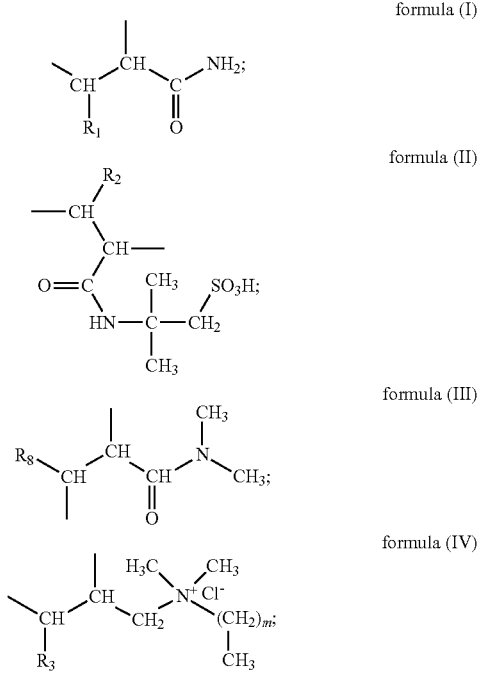

formula (I)

formula (II)

formula (III)

formula (IV)

wherein $R_1$, $R_2$, $R_3$ and $R_8$ are the same as or different from each other, and are H or $C_1$-$C_4$ substituted or unsubstituted alkyl respectively and independently; wherein m is 15, 17, 19 or 21;

wherein based on the total weight of the well cementing cement slurry, a dose of the quaternary cement settlement stabilizer of an oil well is 0.4-0.8 wt %.

2. The well cementing cement slurry according to claim 1, wherein $R_1$, $R_2$, $R_3$ and $R_8$ are H, methyl, ethyl, n-propyl, isopropyl, or butyl respectively and independently; m is 17, 19 or 21.

3. The well cementing cement slurry according to claim 2, wherein $R_1$, $R_2$, $R_3$ and $R_8$ are H.

4. The well cementing cement slurry according to claim 1, wherein the weight-average molecular weight of the quaternary cement settlement stabilizer is 4,200,000-5,500,000.

5. The well cementing cement slurry according to claim 4, wherein the weight-average molecular weight of the quaternary cement settlement stabilizer is 4,500,000-5,300,000.

6. A method for preparing the well cementing cement slurry of claim 1, comprising preparing the oil well cement settlement, comprising:
   mixing a monomer A, a monomer B, a monomer C, a monomer D, and deionized water and then controlling them to have a copolymerization reaction in the presence of an initiator; wherein the monomer A, the monomer B, the monomer C, and the monomer D are dosed so that the molar ratio of the structural units A to the structural units B to the structural units C to the structural units D in the oil well cement settlement stabilizer is x:y:z:q=1:(0.09-0.34):(0.28-0.36):(0.03-0.05);
   wherein the monomer A has a structure represented by formula (V), the monomer B has a structure represented by formula (VI), the monomer C has a structure represented by formula (VII), and the monomer D has a structure represented by formula (VIII);

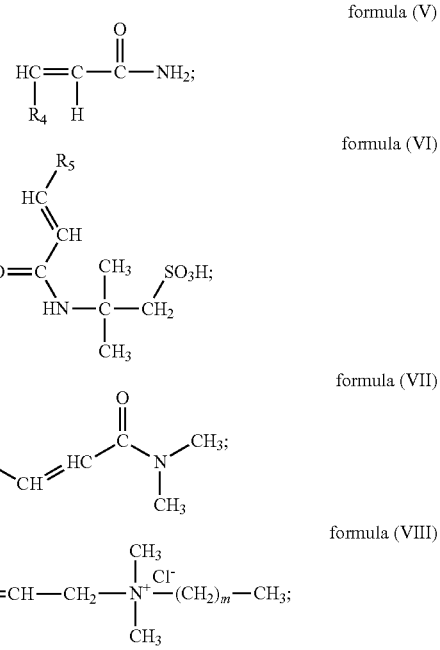

formula (V)

formula (VI)

formula (VII)

formula (VIII)

wherein $R_4$, $R_5$, $R_6$ and $R_7$ are the same as or different from each other, and are H or $C_1$-$C_4$ substituted or unsubstituted alkyl respectively and independently;
wherein m is 15, 17, 19 or 21.

7. The method according to claim 6, wherein during mixing the monomer A, the monomer B, the monomer C and the monomer D, the weight ratio of the monomer A to the monomer B to the monomer C to the monomer D is (1-30):(1-10):(1-10):1;

wherein $R_4$, $R_5$, $R_6$ and $R_7$ are H, methyl, ethyl, n-propyl, isopropyl, or butyl respectively and independently;

wherein m is 17, 19 or 21.

8. The method according to claim 7, wherein the total dose of the monomer A, the monomer B, the monomer D, and the monomer C is 30-40 wt % of the dose of the deionized water.

9. The method according to claim 7, wherein the pH of a mixed solution is 6-8, wherein the mixed solution is obtained from the mixing of the monomer A, the monomer B, the monomer C, and the monomer D.

10. The method according to claim 6, wherein the initiator is sodium bisulfite and/or ammonium persulfate.

11. The method according to claim 10, wherein the molar ratio of the dosed sodium bisulfite to the dosed ammonium persulfate is 1:(1.2-1.5).

12. The method according to claim 11, wherein the molar ratio of the dosed sodium bisulfite to the dosed ammonium persulfate is 1:(1.2-1.4).

13. The method according to claim 10, wherein the total dose of the sodium bisulfite and the ammonium persulfate is 0.5-1 wt % of the total dose of the monomer A, the monomer B, the monomer D, and the monomer C.

14. The method according to claim 6, wherein the conditions of the copolymerization reaction include: reaction for 6-8 h at 40-60° C. temperature in still state.

15. The method according to claim 14, wherein the initiator is added by dropwise adding to the mixed solution mixed from the monomer A, the monomer B, the monomer D, and the monomer C, and the deionized water at 0.5-1.0 ml/min. dropwise adding rate under a condition of stirring at 100-200 r/min. constant stirring rate.

16. The method according to claim 6, further comprising purifying and drying the reaction product obtained through the copolymerization reaction, and purifying the reaction product with absolute ethyl alcohol for 1-6 times.

* * * * *